(12) United States Patent
Summer et al.

(10) Patent No.: US 11,886,182 B2
(45) Date of Patent: Jan. 30, 2024

(54) SYSTEMS AND METHODS OF DETECTING INTENT OF SPATIAL CONTROL

(71) Applicant: TOMAHAWK ROBOTICS, INC., Melbourne, FL (US)

(72) Inventors: Matthew D. Summer, Melbourne, FL (US); William S. Bowman, Melbourne, FL (US); Andrew D. Falendysz, Winter Green, FL (US); Kevin M. Makovy, Palm Bay, FL (US); Daniel R. Hedman, Palm Bay, FL (US); Bradley D. Truesdell, Vero Beach, FL (US)

(73) Assignee: Tomahawk Robotics, Inc., Melbourne, FL (US)

( * ) Notice: Subject to any disclaimer, the term of this patent is extended or adjusted under 35 U.S.C. 154(b) by 291 days.

(21) Appl. No.: 17/417,176

(22) PCT Filed: Dec. 31, 2019

(86) PCT No.: PCT/US2019/069141
§ 371 (c)(1),
(2) Date: Jun. 22, 2021

(87) PCT Pub. No.: WO2020/142543
PCT Pub. Date: Jul. 9, 2020

(65) Prior Publication Data
US 2022/0083069 A1 Mar. 17, 2022

Related U.S. Application Data

(60) Provisional application No. 62/786,888, filed on Dec. 31, 2018.

(51) Int. Cl.
*G05D 1/00* (2006.01)
*B62D 57/02* (2006.01)
(Continued)

(52) U.S. Cl.
CPC ........... *G05D 1/0016* (2013.01); *B62D 57/02* (2013.01); *G05D 1/0033* (2013.01);
(Continued)

(58) Field of Classification Search
CPC .. G05D 1/0016; G05D 1/0033; G05D 1/0038; G05D 1/0223; B62D 57/02; G06F 3/0346; F41H 7/005; F41H 11/28
See application file for complete search history.

(56) References Cited

U.S. PATENT DOCUMENTS

| | | | |
|---|---|---|---|
| 5,617,515 | A | 4/1997 | Maclaren et al. |
| 7,702,442 | B2 | 4/2010 | Takenaka |

(Continued)

FOREIGN PATENT DOCUMENTS

| | | |
|---|---|---|
| EP | 0664040 B1 | 2/2000 |
| EP | 0679974 B1 | 5/2002 |

(Continued)

OTHER PUBLICATIONS

International Search Report and Written Opinion for International Application No. PCT/US19/69141; dated Apr. 29, 2020; 14 pages.

(Continued)

*Primary Examiner* — Kira Nguyen
(74) *Attorney, Agent, or Firm* — Perkins Coie LLP

(57) ABSTRACT

Systems and methods of manipulating/controlling robots. In many scenarios, data collected by a sensor (connected to a robot) may not have very high precision (e.g., a regular commercial/inexpensive sensor) or may be subjected to dynamic environmental changes. Thus, the data collected by the sensor may not indicate the parameter captured by the sensor with high accuracy. The present robotic control system is directed at such scenarios. In some embodiments, the disclosed embodiments can be used for computing a sliding velocity limit boundary for a spatial controller. In (Continued)

some embodiments, the disclosed embodiments can be used for teleoperation of a vehicle located in the field of view of a camera.

15 Claims, 29 Drawing Sheets

(51) Int. Cl.
*G05D 1/02* (2020.01)
*G06F 3/0346* (2013.01)

(52) U.S. Cl.
CPC ......... *G05D 1/0038* (2013.01); *G05D 1/0223* (2013.01); *G06F 3/0346* (2013.01)

(56) References Cited

U.S. PATENT DOCUMENTS

| | | | |
|---|---|---|---|
| 8,267,786 B2 | 9/2012 | Ikeda | |
| 8,355,818 B2 | 1/2013 | Nielsen et al. | |
| 8,924,021 B2 | 12/2014 | Dariush et al. | |
| 8,965,620 B2 | 2/2015 | Bosscher et al. | |
| 9,498,883 B2 | 11/2016 | Jun et al. | |
| 10,081,104 B1 | 9/2018 | Swilling | |
| 11,036,217 B2* | 6/2021 | Shamma | B64C 39/024 |
| 11,079,751 B2* | 8/2021 | Benda | H04L 67/125 |
| 2006/0028548 A1 | 2/2006 | Salivar et al. | |
| 2010/0228406 A1 | 9/2010 | Hamke et al. | |
| 2011/0071789 A1 | 3/2011 | Han et al. | |
| 2011/0106339 A1* | 5/2011 | Phillips | G05D 1/0274 701/2 |
| 2012/0185098 A1 | 7/2012 | Bosscher et al. | |
| 2012/0203487 A1 | 8/2012 | Johnson et al. | |
| 2014/0046589 A1 | 2/2014 | Metzler et al. | |
| 2014/0210663 A1 | 7/2014 | Metzler | |
| 2014/0336848 A1 | 11/2014 | Saund et al. | |
| 2015/0220085 A1 | 8/2015 | Ohtomo et al. | |
| 2016/0291593 A1 | 10/2016 | Hammond et al. | |
| 2016/0371983 A1 | 12/2016 | Ronning et al. | |
| 2017/0045893 A1 | 2/2017 | Goulding | |
| 2017/0068242 A1* | 3/2017 | Liu | B64C 39/024 |
| 2017/0095382 A1 | 4/2017 | Wen et al. | |
| 2017/0329403 A1 | 11/2017 | Lai | |

FOREIGN PATENT DOCUMENTS

| | | |
|---|---|---|
| EP | 1193168 B1 | 5/2006 |
| EP | 1 870 670 A1 | 12/2007 |
| WO | 2016089442 A1 | 6/2016 |
| WO | 2017204826 A1 | 11/2017 |

OTHER PUBLICATIONS

International Search Report and Written Opinion for International Application No. PCT/US19/69159; dated Mar. 18, 2020; 12 pages.
International Search Report and Written Opinion of International Application No. PCT/US19/69148; dated Mar. 24, 2020; 8 pages.
U.S. Appl. No. 17/417,194 for Summer et al. filed Jun. 22, 2021.
U.S. Appl. No. 17/417,206 for Summer et al. filed Jun. 22, 2021.
Extended European Search Report issued in corresponding European Patent Application No. 19906876.8 dated Jul. 8, 2022 (10 pages).
Xuesu Xiao et al., "Visual Servoing for Teleoperation using a Tethered UAV," 2017 IEEE International Symposium on Safety, Security and Rescue Robotics (SSRR), IEEE, Oct. 11, 2017, pp. 147-152, XP033242142, DOI: 10.1109/SSRR.2017.8088155.
Josep-Arnau Claret et al., "Teleoperating a Mobile Manipulator and a Free-Flying Camera from a Single Haptic Device," 2016 IEEE International Symposium on Safety, Security, and Rescue Robotics (SSRR), IEEE, Oct. 23, 2016, pp. 291-296, XP0330222240, DOI: 10.1109/SSRR.2016.7784318.
Extended European Search Report issued in corresponding European Patent Application No. 19906801.6 dated Dec. 13, 2022 (9 pages).
Replacement Extended European Search Report issued in corresponding European Patent Application No. 19906801.6 dated Dec. 20, 2022 (13 pages).
Extended European Search Report issued in corresponding European Patent Application No. 19907050.9 dated Dec. 20, 2022 (18 pages).
Joseph-Arnau Claret et al., "Teleoperating a mobile manipulator and a free-flying camera from a single haptic device," 2016, IEEE International Symposium on Safety, Security, and Rescue Robotics (SSRR), IEEE, Oct. 23, 2016, pp. 291-296, XP033022240, DOI: 10.1109/SSRR.2016.7784318 [retrieved on Dec. 14, 2016].

* cited by examiner

SYSTEMS AND METHODS OF DETECTING INTENT OF SPATIAL CONTROL

TECHNICAL FIELD

This disclosure is related to robotic solutions. More particularly, embodiments disclosed herein are directed at robotic control systems and their associated interaction workspaces.

BACKGROUND

Robots are playing a vital role in today's industrial automation and home automation systems. As the field of robotics develops, robots are being employed for multiple applications and functionalities. For example, instead of humans, robots can be used to remotely monitor areas of importance on the ground, under water, or in the air. In many applications, robots can replace humans to do routine, mundane jobs. In some other applications, high risk jobs can be performed by robots (e.g., bomb disposal robots).

The ubiquitous use of electronic devices has led to an emerging vision which brings together pervasive sensors and objects with robotic and autonomous systems. These sensors can be configured to create an open and comprehensive network of intelligent objects that have the capacity to auto-organize, share information, data and resources, reacting and acting in face of situations and changes in the environment. IoT sensors embedded in everything from kitchen appliances to home security or energy monitoring systems can exchange information in real time (or close to it) through the Internet.

However, as connected production and control applications are becoming more widespread, they rely on proprietary technology which prevents interoperability issues when sensors from different manufacturers or different applications communicate with each other. Such siloed robotic control systems are also typically expensive often employing high-precision sensing or data capture/aggregation technologies. Thus, there is a need for a robotic control system that can provide robust, yet low-cost data capture/aggregation and be able to work with a wide variety of sensors from different manufacturers and/or serving different applications.

DETAILED DESCRIPTION

Figure 1A:
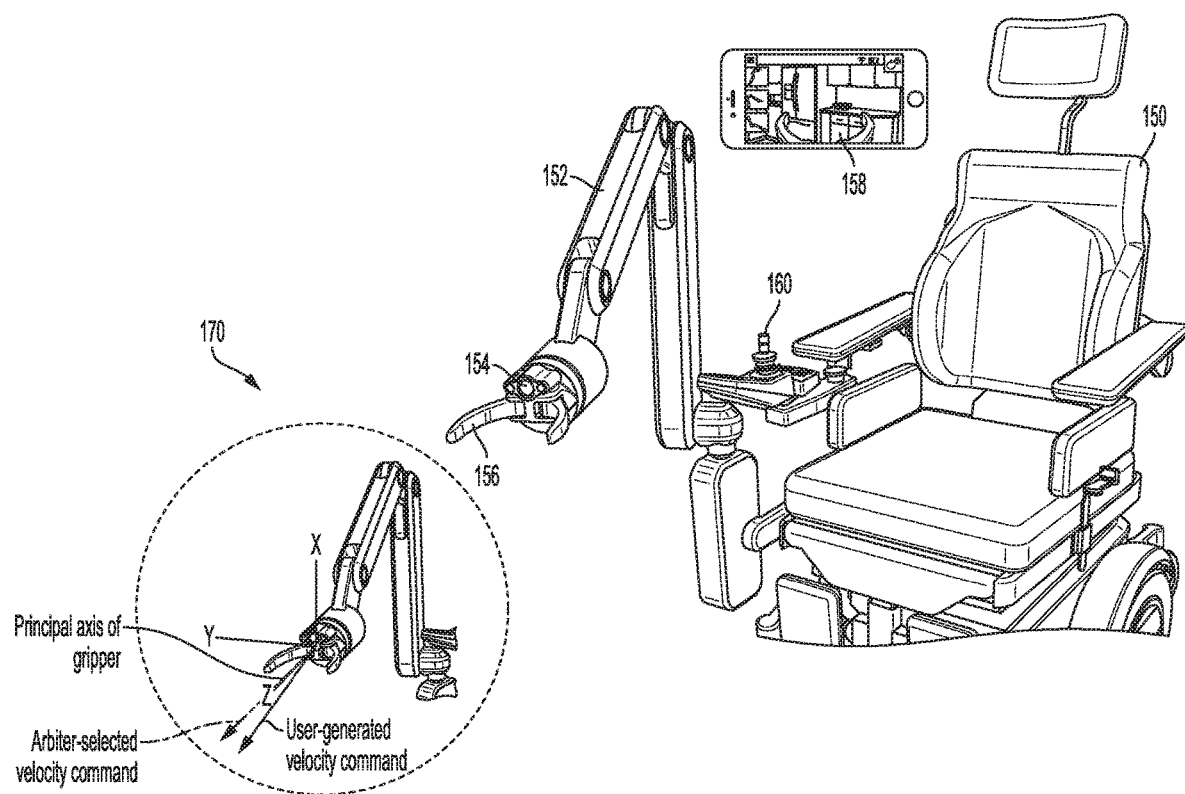
FIG. 1A shows an overview of operation of a representative robot controlled in accordance with the disclosed technology.

This disclosure is directed at systems and methods of improved robotic solutions. One example of a solution is a control system for controlling one or more robots, vehicles, or manipulator arms. In many scenarios, data collected by a sensor (connected to a robot) may not have very high precision (e.g., a regular commercial/inexpensive sensor) or may be subjected to dynamic environmental changes. Thus, the data collected by the sensor may not indicate the parameter captured by the sensor with high accuracy. For example, the inertial sensors (such as an accelerometer or gyroscope) of a mobile device (such as a tablet computer or a cell phone) may not have very high precision in measuring the inertial motion of the mobile device. In some aspects, the present robotic control system can be directed at such scenarios. That is, one patentable advantage of the disclosed control system is that it is ruggedized for deployment in the real world where sensors (i.e., hardware and/or software) such as IoT sensors are subject to dynamic environmental challenges. Another advantage of the disclosed control system is that provides highly intuitive (i.e., easily understandable by humans) control of robotic manipulation systems (e.g., robotic arms). Yet another advantage of the disclosed robotic control system is that it is platform agnostic (i.e. it can be mounted or is otherwise associated with any suitable robotic platform). Further, another advantage of the disclosed robotic control system is that it can be integrated to exchange (i.e., send to and/or receive from) information with a wide variety of sensors, from different vendors, and for different applications.

In some embodiments, the disclosed control system can be a stand-alone app running on a mobile device (e.g., on a mobile phone or a tablet having a graphical user interface (GUI)). In some embodiments, the disclosed control system can be integrated into third party apps running on a mobile device. In some embodiments, the disclosed control system can be integrated into a robot (or, otherwise suitable application hardware) to remotely control the operation and/or movement of the robot via a desktop app or a mobile app. Examples of a robot include manipulation systems with one or more robotic arms and remotely operated vehicles that move underwater, in the air, or on land using propellers, tracks, wheels, legs, or serpentine motion. In some embodiments, robotic arm(s) can have multiple degrees of freedom, a gripper for interaction with the environment and a camera sensor that relays image/video feedback to the disclosed control system. In some embodiments, the robotic arm(s) can be mounted on a ground vehicle having wheels, tracks, legs, or other suitable mechanisms to enable the "body" of the vehicle to be controlled by the robotic control system in 1 (one) or more degrees of freedom. In some embodiments, the disclosed control system can send commands or instructions to a robot or a vehicle, causing the robot to move or maneuver. In some embodiments, the commands or instructions can be directed to move or maneuver a part of a robot without movement of the other body. For example, the commands or instructions can cause movement of the body of the vehicle without movement of the ends of legs of the vehicle.

In some embodiments, movement of a robot (or a part thereof) can be an outcome of moving a spatial controller, a joystick, or a user-provided gesture indicated on a user interface. The spatial controller can be connected via a wired or a wireless connection to a computing device that is configured to run the disclosed robotic control system. Information (e.g., linear and/or angular displacement, velocity, etc.) generated from the user's movement is used to compute parameters (e.g., target velocities, direction of motion, etc.) of a remotely-located robot or a vehicle. In some embodiments, a user can view movement of the robot or the vehicle on a display screen of the computing device. Various embodiments, advantages, and aspects of the disclosed technology will be apparent in the following discussions.

In some embodiments, the disclosed robotic control system can be configured to operate in two modes: a position or "mimic" mode and a velocity or "fly" mode. In the mimic mode, the robotic control system mimics the velocity of the spatial controller. For example, as an operator moves the spatial controller while holding down the "move" button located on the spatial controller, the robotic control system maps the velocity of the spatial controller to the velocity of the robot. In the fly mode, the robotic control system operates the robot or vehicle to move with a non-zero velocity as the operator continues to hold the spatial controller at a position away from the rest position of the spatial controller while holding down the "move" button.

A robot, vehicle, or spatial controller can have up to 6 degrees-of-freedom (DOF), including up to 3 linear DOF and up to 3 angular DOF. The linear and angular DOFs can each be expressed as vectors in a coordinate system with up to 3 dimensions. A coordinate system is referred to herein as a "coordinate frame" or "reference frame".

Referring now to the drawings, FIG. 1A shows an overview of operation of a representative robot. For example, FIG. 1A shows a portion of wheelchair 150 to which a robotic system is attached. The robotic system (which can be added as a "bolt-on" attachment) includes a robotic manipulator arm 152 coupled to a gripper 156. Gripper 156 includes video camera and lights (collectively denoted as 154). Operation of gripper 156 can be viewed remotely (in the form of live video) on the screen of an electronic device 158 configured to run the disclosed control system. The disclosed embodiments allow use of intuitive movements or gestures associated with the mobile device 158 to remotely operate gripper 156 and/or robotic manipulator arm 152 by interpreting the operator's intentions from the measurements of the inertial sensors in the mobile device 158. For example, when an operator moves mobile device 158 in a motion that approximates a pure rotation about the gripper axis, the disclosed system can detect the gesture indicating the operator's intent and move the gripper 156 through a pure rotation about its axis. Thus, by observing the motion of the spatial controller (e.g., mobile device 158), the disclosed control system software can detect and execute the operator's intended motion. Because the control system software is able to resolve the intent of the operator's intended motion, the control system software is termed as a "direction intent arbiter." Region 170 in FIG. 1A shows that the gripper and the direction intent arbiter have identical the principal axes.

Using traditional robotics methodologies, a user sitting on wheelchair 150 would possibly be able to control the operation of gripper 156 and/or robotic manipulator arm 152 only by manipulating joystick 160. The present technology eliminates such a need. The user sitting on a wheelchair, according to the present technology, can operate gripper 156 and/or robotic manipulator arm 152 using intuitive motion of mobile device 158 and the robotic manipulator arm 152 does not receive any command signal or telemetry signal from knob 160, or otherwise from the wheelchair. Thus, one advantage of the disclosed technology is that it increases user independence and quality of life by maximizing reachable space while minimizing user fatigue and effort. This can be of benefit in reducing the cognitive burden of users with limited motor functions. Further, camera and lights 156 extend a user's sight and reaching abilities. For example, the user can use the disclosed technology to reach items on a shelf that is a few feet vertically above wheel chair 150. Consequently, a user on a wheelchair would require less assistive care for mundane and repetitive tasks.

Figure 1B:
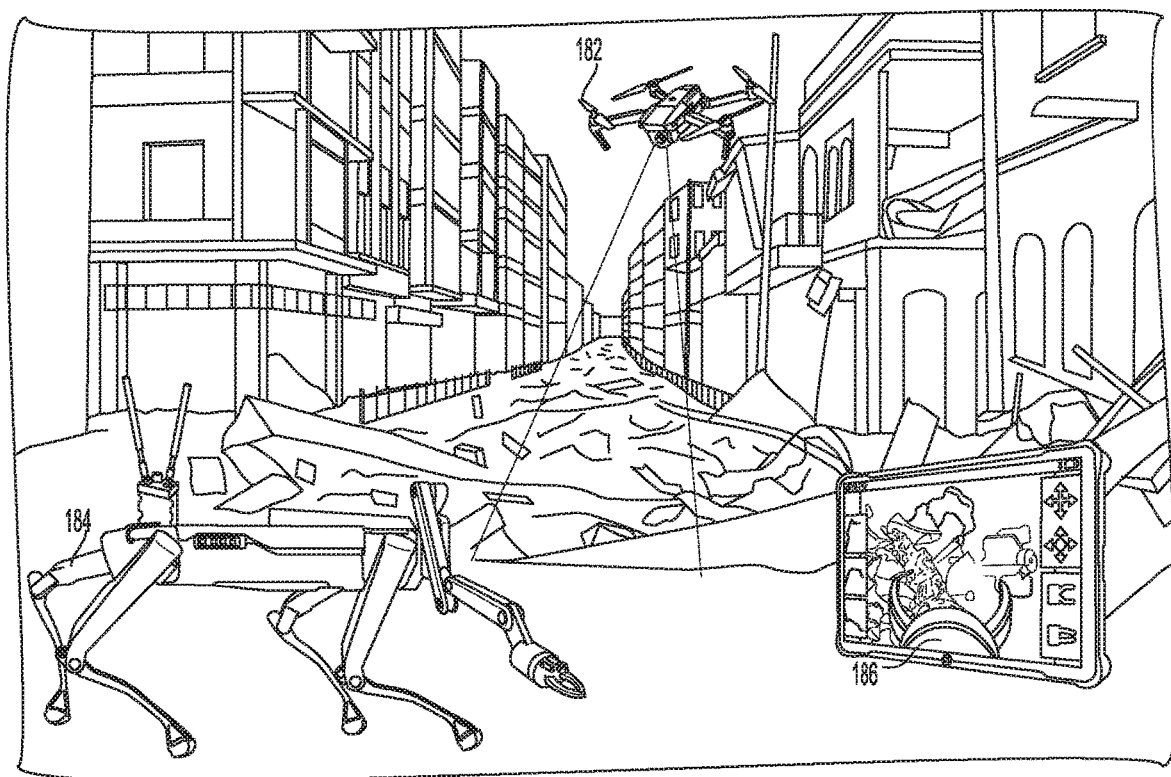
FIG. 1B shows an overview of operation of a distributed robotic system for remote monitoring using multiple robots.

FIG. 1B shows an overview of operation of another representative robot controlled in accordance with the disclosed technology. In this operation, the disclosed robotic control system can recognize, select, and interact with objects from the perspective of different robotic agents or platforms. As a result, this allows global object interaction. For example, FIG. 1B shows a Squad Assist Robotic System (including an air/flying robotic system 182 and a ground robotic system 184) for addressing threats in highly unstructured terrain, such as in explosive ordnance disposal (EOD), intelligence, surveillance and reconnaissance (ISR) and special weapons and tactics (SWAT) missions. As an operator sees an object of interest (such as a suspicious package or a bomb) in the camera view 186 obtained from ground robot

184, the operator selects the object of interest on a user interface associated with the control system, and commands flying robot 182 to automatically track the object of interest with a different camera for a better view. In some embodiments, the robotic system can be used as a force multiplier for the operator via seamless UAS/UGV teaming and commanded via an intuitive GUI configured to run on a portable controller. In this example of the disclosed technology, the operator uses a portable controller that relies on intuitive inertial inputs to command both air and ground robotic systems, minimizing training time and cognitive burden while enabling novel coordinated capabilities. For example, the operator could control the ground robot from the perspective of a camera mounted on the aerial robot that provides an unobstructed view of its surroundings, while the ground vehicle is in the field of view of the camera on the aerial vehicle. The robotic system complies with the military's interoperability (IOP) architecture requirements to ensure future-proof capability expansion through upgrades and new payloads without costly platform replacements.

Figure 1C:
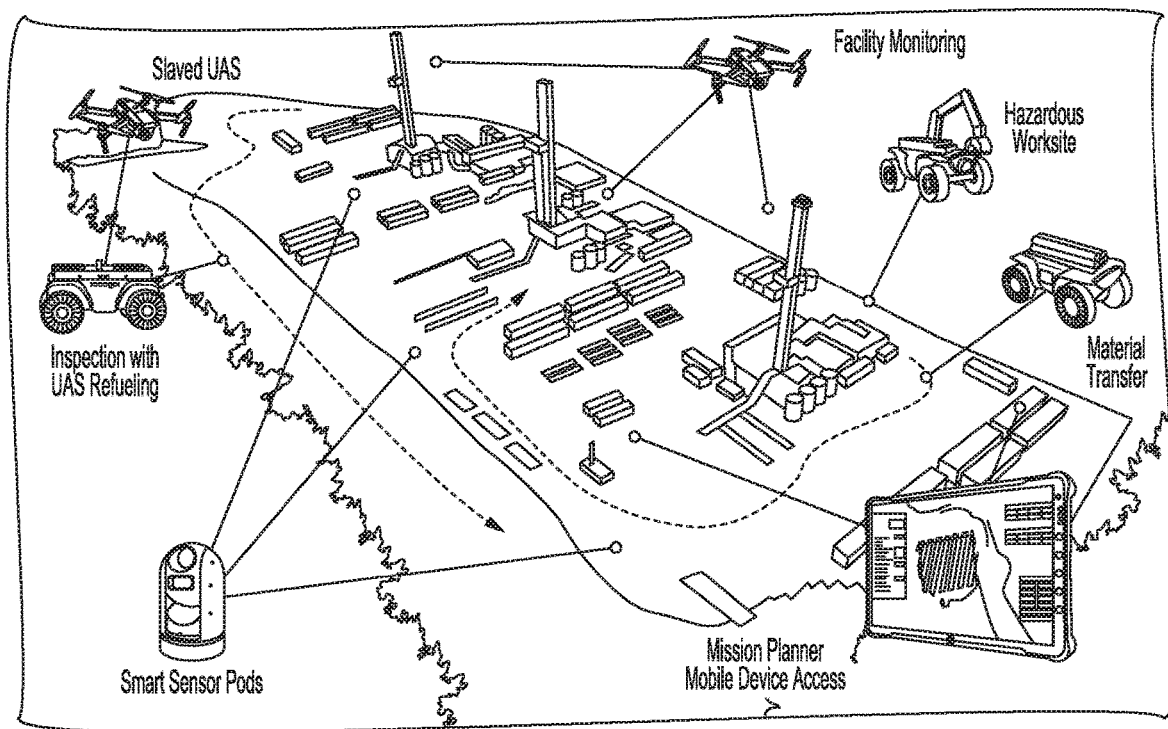
FIG. 1C shows a diagrammatic representation of another distributed robotic system for remote monitoring using multiple robots.

FIG. 1C shows a diagrammatic representation of a distributed robotic system for remote monitoring using multiple robots. The distributed robotic system is a collaborative, one-to-many control system for multi-domain unmanned systems. Examples of multi-domain unmanned systems include slaved UAS, smart sensor pods, facility monitoring UASs, and the like. These unmanned systems can be used to monitor hazardous worksites and transfer of hazardous materials. The control system can be configured to be accessible via a mobile device app.

Figure 1D:
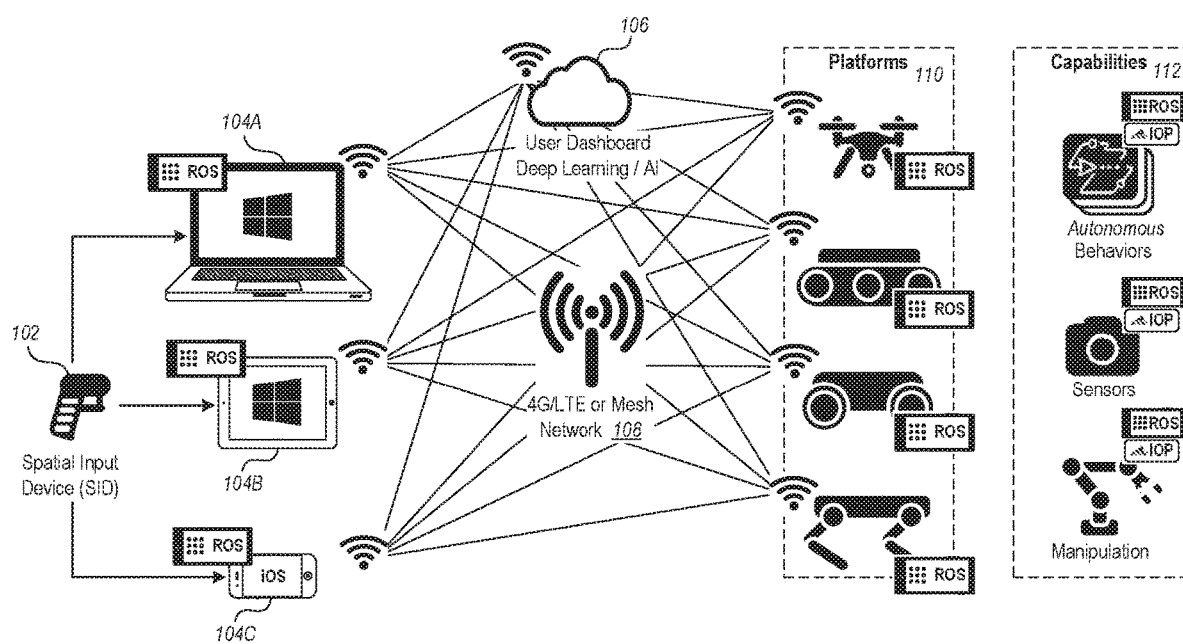
FIG. 1D shows a diagrammatic representation of a robotic control system operating in an example environment.

FIG. 1D shows a diagrammatic representation of a robotic control system operating in an example environment. A spatial input device (SID) 102 provides inputs to electronic devices 104A, 104B, 104C running the disclosed robotic control system. The robotic control system is an application—mission planner software, configured to run on devices 104A, 104B, 104C. The control system application software can be written using a software environment called the Robot Operating System (ROS). ROS provides a collection of tools, libraries, and conventions to create robot capabilities 112 across a wide variety of platforms 110. Devices 104A, 104B, 104C are configured to display user dashboard 106 with an easy-to-operate, user-friendly format. Devices 104A, 104B, 104C communicate over a wireless communications network 108 (e.g., 4G, LTE, or mesh networks). In some embodiments, the disclosed robotic control system can be used to control unmanned vehicles in the air, on the ground, on the water surface, or underwater. In some embodiments, the disclosed control system enables collaboration of multi-domain (air/ground/maritime) unmanned systems. Thus, one advantage of the control system is that it can solve problems larger than the sum of robotic "parts" with multi-platform teaming. Examples of spatial input device 102 include (but are not limited to) a mobile phone, a tablet computer, a stylus for a touch screen, a light beam scanner, a motion controller, a gaming controller, or a wearable device worn on any part of the human body. Examples of platforms 110 include (but are not limited to) mobile aerial vehicles (multi-rotor and fixed-wing), ground vehicles (tracked, wheeled, or legged), and maritime vehicles (surface and subsurface), or stationary (fixed or steerable) platforms. Capabilities 112 can be associated with performing autonomous behaviors, sensor-related tasks, or object manipulation tasks (e.g., using robotic arm manipulators). In some embodiments, the disclosed control system provides supports for tele-operation (e.g., allowing users to remotely "drive" a robot) integrated with obstacle detection and avoidance functionalities. In some embodiments, the disclosed control system is agnostic to the underlying communications network 108. In some embodiments, the robotic control system can integrate deep learning, artificial intelligence, or other suitable machine learning methodologies. In some embodiments, the robotic control system provides cloud-based access that augments edge processing to unlock deep learning and custom analytics.

Figure 2A:
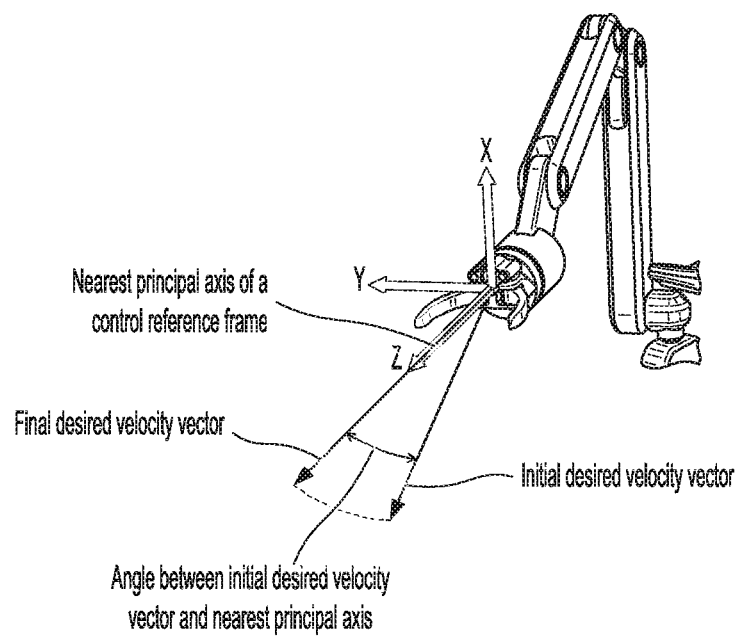
FIG. 2A shows an example use case of application of detecting an intended direction of a velocity command from a spatial controller.

FIG. 2A shows an example use case of application of detecting an intended direction of a velocity vector from a spatial controller. In some examples, a user may wish to generate pristine or ideal movement of a gripper or a spatial controller. But the generated movement may not be ideal. Advantageously, the disclosed control system may detect that the initially generated movement is not "notably ideal" and accordingly rectify such movement. For example, a user may wish to generate movement such that a gripper moves along an intended or desired straight line, but the resulting movement may be generated along a different straight line. FIG. 2A shows such a scenario. A user may wish to generate movement of the gripper along the Z axis, but the resulting movement occurs at an angle with respect to the Z axis. In FIG. 2A, a coordinate frame is shown attached to a gripper. For illustration purposes, a control reference frame (e.g., with respect to the disclosed robotic control system) is considered to be the same as the gripper's coordinate frame. (In alternate embodiments, the control reference frame can be a suitable frame different from the gripper's reference frame.) FIG. 2A shows that a user may cause (e.g., by moving a spatial controller or a joystick) the gripper to move along an initial direction denoted as the "initial desired velocity vector." The direction of the initial desired velocity vector in FIG. 2A is shown to be at an angle with respect to the Z axis of the control reference frame—the intended direction of movement. The disclosed robotic control system can detect that the Z axis of the control reference frame is the nearest principal axis direction (i.e., among X, Y, and Z principal axes) of the control reference frame. The disclosed control system can also compute the angle (e.g., a misalignment representing the deviation of the initial desired velocity vector from the direction of the nearest principal axis) with respect to the Z axis of the control reference frame. Upon detecting that the angle with respect to the Z axis of the control reference frame is less than an axis-snapping value, the disclosed robotic control system can define a final desired velocity vector by rotating the initial desired velocity vector such that the final desired velocity vector is parallel to the direction of the nearest principal axis of the control reference frame (e.g., the Z axis).

In some examples, a user may wish to generate a linear movement and/or an angular movement (e.g., a twist, a rotation, or a revolution with respect to an axis) of a spatial controller or a gripper. In such scenarios, the disclosed robotic control system can detect whether the intended movement is a linear-only movement, an angular-only movement, or a combination of a linear and an angular movement. Thus, in some embodiments, the disclosed control system can perform regime arbitration to determine whether the intended movement is exclusively in the linear regime, exclusively in the angular regime, or in a combination of both linear and angular regimes. The regime arbitration can be performed on the basis of a linear ratio and an angular ratio computed from movement data of the spatial controller or joystick.

Figure 2B:
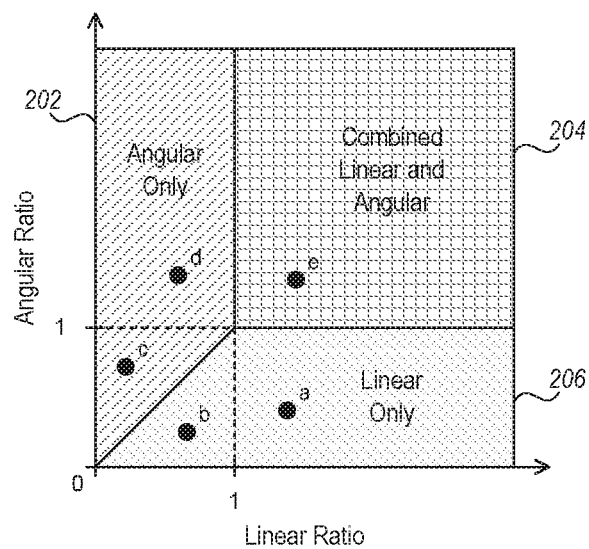
FIG. 2B shows a diagrammatic representation of regime arbitration.

FIG. 2B shows a diagrammatic representation of regime arbitration. Regime arbitration is a technique of determining (using a linear ratio and an angular ratio) whether a user intended to generate linear motion, angular motion, or both linear and angular motion of a spatial controller. For example, FIG. 2B graphically illustrates regime arbitration using five points denoted a, b, c, d, and e. Each of these points is represented as a coordinate point expressed as (linear ratio, angular ratio). These five points represent possible combinations of linear and angular ratios computed using the magnitudes of linear and angular velocities obtained from spatial motion data of a spatial controller. Because the angular ratio at points a and b are less than 1, example points a and b are determined to be in the linear-only regime (i.e., motion data corresponds solely to linear motion) of the spatial controller. That is, the disclosed robotic control system ignores any angular motion generated by the spatial controller. Because the linear ratio at points c and d are less than 1, example points c and d are determined to be in the angular-only regime (i.e., motion data corresponds solely to angular motion) of a spatial controller. That is, the disclosed robotic control system ignores any linear motion generated by the spatial controller. Point e is an example of a combined linear and angular regime (i.e., motion data corresponds to both linear and angular motion) because the linear ratio and the angular ratio both exceed 1. Thus, the point (1, 1) in FIG. 2B is an inflection point FIG. 2B because it marks a boundary between small (ratio less than 1) for large (ratio greater than 1) for linear and angular motion of a spatial controller. If either ratio is less than 1, it is ignored unless the other ratio is smaller (i.e. a user probably intended the more dominate regime of motion). If both ratios are greater than 1, then neither regime is ignored (i.e. the user probably intended both linear and angular motion).

Figure 2C:
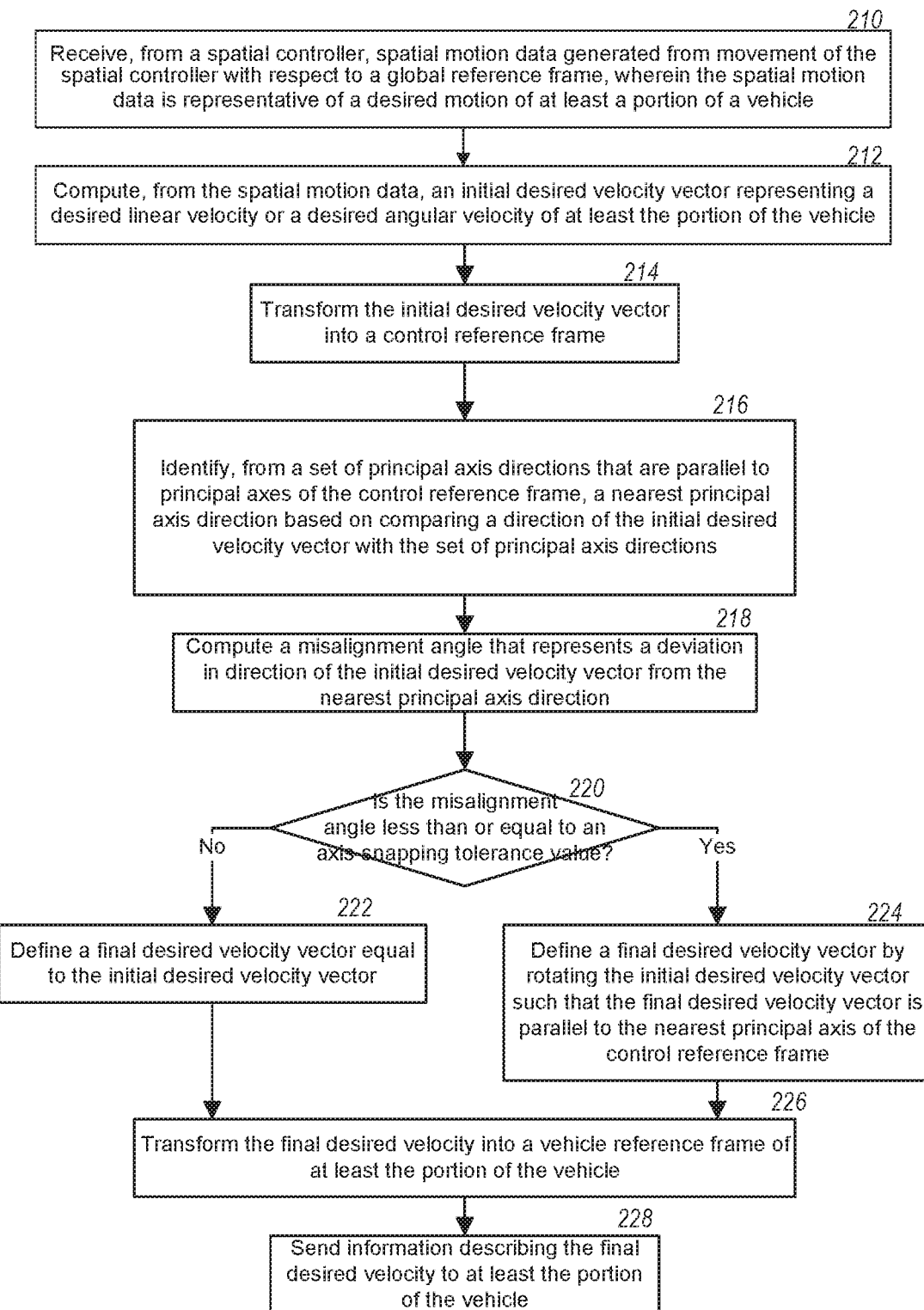
FIG. 2C is an example flowchart of a process for detecting an intended direction of a velocity command from a spatial controller.

FIG. 2C is an example flowchart of a process for detecting an intended direction of a velocity command from a spatial controller. In some embodiments, the process can be one of multiple processes associated with the disclosed robotic control system. For example, a user or an operator can move a spatial controller which causes movement or maneuvering of a robot, a vehicle, a gripper, or a robotic arm, causing the vehicle, the gripper, or the robotic arm to go along a direction relatively "close" to the original direction intended by the user. In some instances, the movement can be related to a portion or part of a robot, a vehicle, a gripper, a robotic arm. The spatial controller can be connected via a wired or a wireless connection to a computing device (e.g., a mobile device or a tablet computer) that is configured to run the process. Based on the movement data from the spatial controller, the computing device can send commands or movement parameters to a remote robot, vehicle, or robotic arm electronically coupled to the computing device. At step 210, the process receives spatial motion data generated from movement of the spatial controller with respect to a global reference frame (e.g., that of the Earth), wherein the spatial motion data is representative of a desired (or, intended) motion of at least a portion of a vehicle. For example, the spatial motion data can be one or more of: displacement parameter(s), velocity parameter(s), acceleration parameter(s) or any combination thereof. At step 212, the process computes an initial desired velocity vector representing a desired linear velocity or a desired angular velocity of at least the portion of the vehicle. At step 214, the process transforms the initial desired velocity vector (e.g., expressed with respect to a frame of the spatial controller) into a control reference frame. For example, the control reference frame can be defined with respect to any one of: the spatial controller, a frame with respect to a user interface on a mobile device or a tablet computer on which the process is configured to run, the robot, vehicle, gripper, robotic arm, or a portion thereof. The transformation (in step 214) may not be necessary if the control reference frame is the same as the frame of the spatial controller. The control reference frame can be composed with a set of principal axes (e.g., X, Y, Z axes). At step 216, the process identifies a nearest principal axis direction based on comparing the direction of the initial desired velocity vector with directions of the set of principal axes that are parallel to the control reference frame. At step 218, the process computes a misalignment angle representing a deviation in direction of the initial desired velocity vector from the nearest principal axis direction from the set of principal axes of the control reference frame. At step 220, the process determines whether the misalignment angle is less than or within a pre-specified axis-snapping tolerance value (e.g. 5 degrees). In some embodiments, the axis-snapping tolerance value can be a tunable parameter. In some embodiments, the axis-snapping tolerance can be adjusted based on a metric associated with the accuracy of the desired velocity vector such as its magnitude. For example, the axis-snapping tolerance can be larger (e.g. 7 degrees) when the magnitude of the velocity is smaller (e.g. less than or equal to 0.1 m/s) and be smaller (e.g. 3 degrees) when the magnitude of the velocity is larger (e.g. greater than 0.1 m/s). Upon determining that the misalignment angle (computed in step 218) is greater than the axis-snapping tolerance value, the process defines (at step 222) a final desired velocity vector equal to the initial desired velocity vector. However, upon determining that the misalignment angle (computed in step 218) is less than or equal to the axis-snapping tolerance value, the process defines (at step 224) a final desired velocity vector based on rotating the initial desired velocity vector such that the final desired velocity vector is parallel to the nearest principal axis of the control reference frame. Thus, the axis-snapping tolerance value defines an extent of a match or closeness between the direction of the initial desired velocity vector and the direction of the nearest principal axis. At step 226, the process transforms the final desired velocity vector (e.g., defined either from step 222 or step 224) into a vehicle reference frame of at least the portion of the vehicle. At step 228, the process sends information indicating the final desired velocity to at least the portion of the vehicle. In some embodiments, the initial desired velocity and the final desired velocity can be linear velocities. In some embodiments, the initial desired velocity and the final desired velocity can be angular velocities. It will be understood that several steps of the process can occur in a parallel or near parallel manner. Also, some steps can be optional depending on the specific use case to which the process is directed.

Figure 2D:
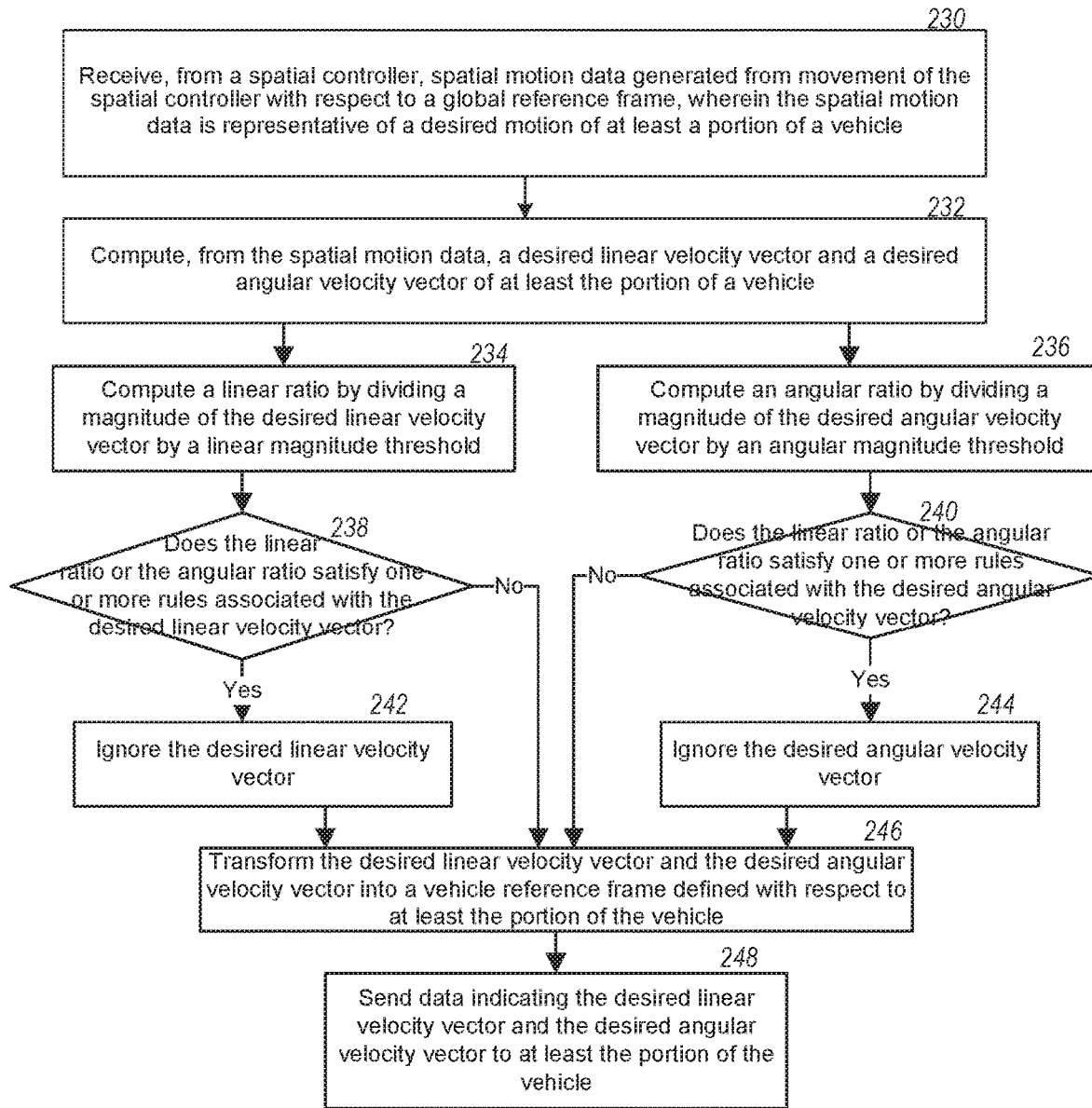
FIG. 2D is an example flowchart of a process for detecting an intended regime of a velocity command from a spatial controller.

FIG. 2D is an example flowchart of a process for detecting an intended regime (e.g., linear, angular, or both) of a velocity command from a spatial controller associated with spatial control of a vehicle. In some embodiments, the process can be one of multiple processes associated with the disclosed robotic control system. For example, a user or an operator can move a spatial controller which causes movement of a robot, a vehicle, a gripper, or a robotic arm, causing the vehicle, the gripper, or the robotic arm to have a linear motion and an angular motion. In some instances, the movement can be related to a portion/part of a robot, a vehicle, a gripper, a robotic arm, any of which can be terrestrial, underwater, or airborne. The spatial controller can be connected via a wired or a wireless connection to a computing device (e.g., a mobile device or a tablet computer) that is configured to run the process. Based on the movement data from the spatial controller, the computing device can send commands or movement parameters to a remote robot, vehicle, or robotic arm electronically coupled to the computing device. At step 230, the process receives spatial motion data generated from movement of the spatial controller with respect to a global reference frame, wherein the spatial motion data is representative of a desired (or, intended) motion of at least a portion of a vehicle. For example, the spatial motion data can be one or more of: displacement parameter(s), velocity parameter(s), acceleration parameter(s) or any combination thereof. The spatial motion data can include data associated with at least one linear degree of freedom and at least one angular degree of freedom. At step 232, the process computes a desired linear velocity vector and a desired angular velocity of at least the portion of the vehicle. The desired linear velocity vector and the desired angular velocity of at least the portion of the vehicle can be in a 1-dimensional, 2-dimensional, or a 3-dimensional space. At step 234, the process computes a linear ratio by dividing a magnitude of the desired linear velocity vector by a linear magnitude threshold. In some embodiments, the linear magnitude threshold is a constant which is used to detect a "small" linear velocity (e.g. 0.05 m/s) that could be due to noise or unintended linear motion of the spatial controller. At step 236, the process computes an angular ratio by dividing a magnitude of the desired angular velocity vector by an angular magnitude threshold. In some embodiments, the angular magnitude threshold is a constant which is used to detect a "small" angular velocity (e.g. 0.05 rad/s) that could be due to noise or unintended angular motion of the spatial controller. At step 238, the process determines whether or not the linear ratio or the angular ratio satisfy one or more rules associated with the desired linear velocity vector. At step 240, the process determines whether or not the linear ratio or the angular ratio satisfy one or more rules associated with the desired angular velocity vector. For example, a rule can be to determine whether the linear ratio is less than 1 and also less than the angular ratio. Another rule can be to determine whether the angular ratio is less than 1 and also less than a linear ratio. If the process determines that rules associated with the desired linear velocity vector are satisfied, then at step 242, the process ignores the desired linear velocity vector. If the process determines that rules associated with the desired angular velocity vector are satisfied, then at step 244, the process ignores the desired angular velocity vector. Ignoring a vector can imply setting the vector to a null vector having a zero magnitude. The purpose of ignoring the linear or angular regimes of motion is to retain only the motion that was intended and ignore any motion that was not intended (or, determined to be not notable). The process then transforms (step 246) the desired linear velocity vector and the desired angular velocity vector into a vehicle reference frame defined with respect to at least the portion of the vehicle. At step 248, the process sends (e.g., as commands or instructions) data indicating the desired linear velocity vector and the desired angular velocity vector to at least the portion of the vehicle that is to be moved. It will be understood that several steps of the process can occur in a parallel or near parallel manner. Also, some steps can be optional depending on the specific use case to which the process is directed.

Figure 3A:
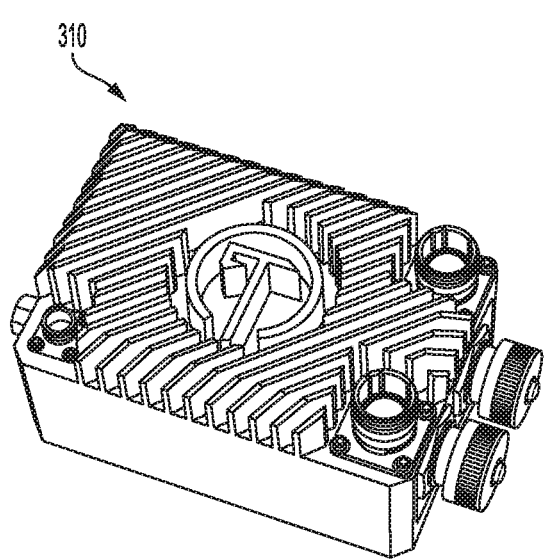
FIGS. 3A-3B show representative examples of application hardware configured to run the disclosed robotic control system.
Figure 3B:
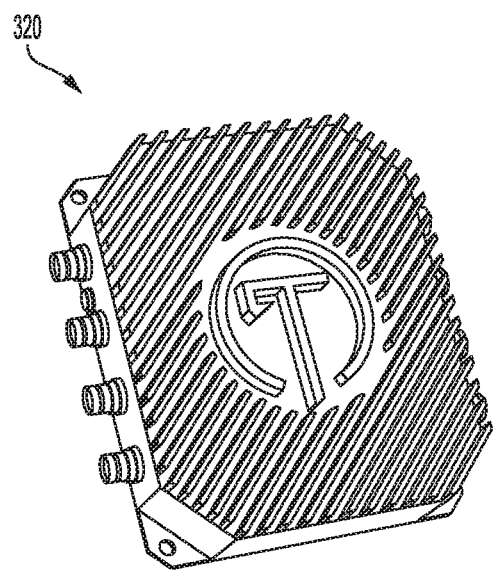

FIGS. 3A and 3B show representative examples of application hardware running the disclosed robotic control system. For example, application hardware 310 is an IxM™ IOP Expansion Module and application hardware 320 is a KxM™ Kinesis Expansion Module. In some embodiments, the application hardware can include communication capabilities including (but not limited to) cellular, MANET, SATCOM, fiberoptic, and/or Wi-Fi. In some embodiments, the hardware includes processors (CPUs and/or GPUs) suitable for computation applications including (but not limited to) computer vision, simultaneous localization and mapping (SLAM), manipulator kinematics, object recognition, change detection, or path-planning. In some embodiments, the hardware can have a built-in inertial measurement system for measuring acceleration. In some embodiments, the robotic control system running on the application hardware can remotely control the operation (and/or movement) of a robotic arm(s) with multiple degrees of freedom, a gripper for interaction with the environment, and a camera sensor that relays video feedback to the application hardware. In some embodiments, the robotic arm(s) can be mounted on a ground vehicle having wheels, tracks, legs, or other suitable mechanisms to enable the "body" of the vehicle to be controlled (by the robotic control system) in 1 (one) or more degrees of freedom. The application hardware can include a touch screen or a display screen for display of objects as captured by the camera sensor. Objects displayed on the touch screen of the application hardware can be selected by a user.

Figure 3C:
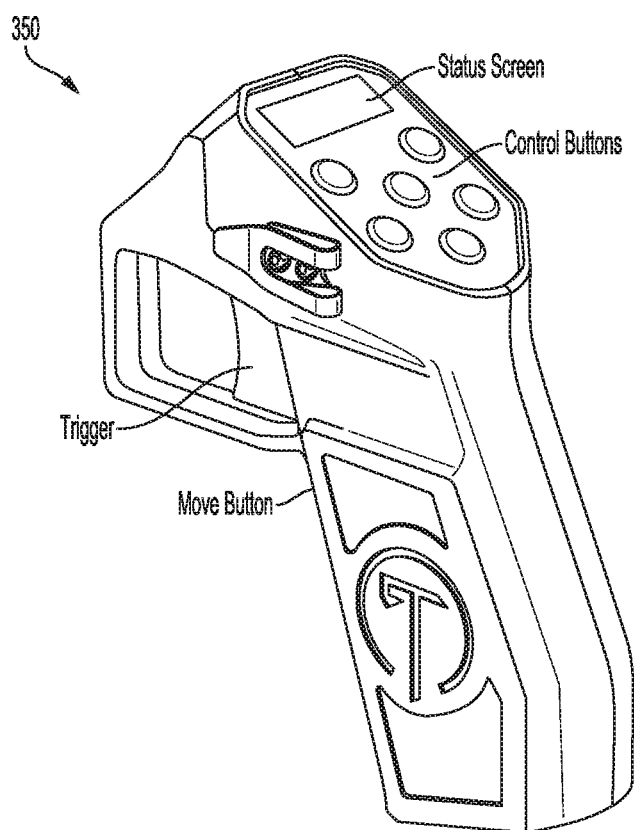
FIG. 3C shows a representative example of a spatial controller.

FIG. 3C shows a representative example of a handheld spatial controller 350. In some embodiments, spatial controller 350 corresponds to spatial input device 102 shown in FIG. 1D. As shown in FIG. 3B, spatial controller 350 can include a display screen and multiple buttons for providing various functionalities.

Figure 4:
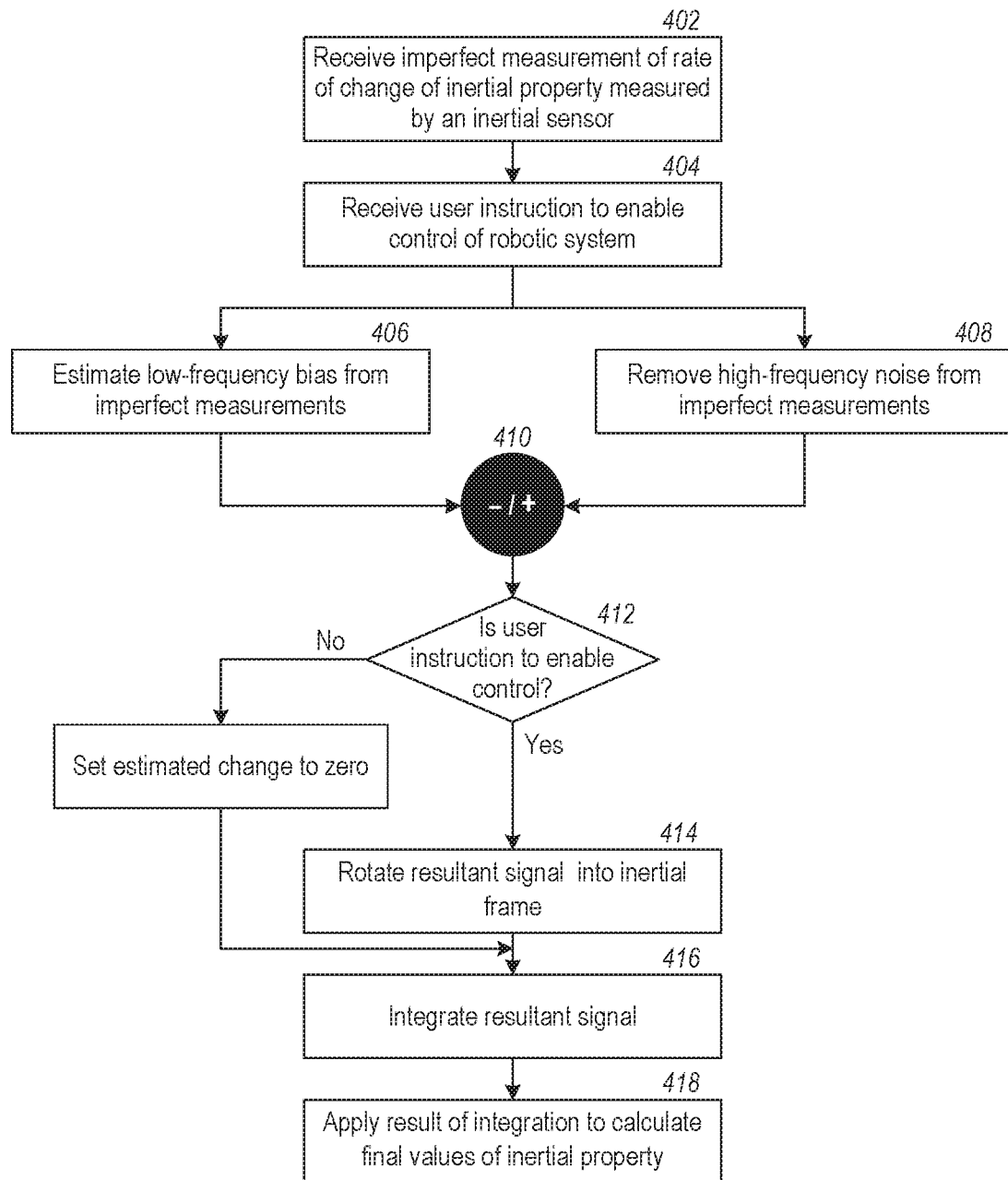
FIG. 4 is an example flowchart of a process for accurately estimating a change in an inertial property of signals measured by an inertial sensor.

FIG. 4 is an example flowchart of a process for accurately estimating a change in an inertial property (e.g. velocity or position) of a spatial controller from the rate of change of that property (e.g., velocity or acceleration) as measured by an inertial sensor. In some embodiments, the inertial sensor is included in the spatial controller. The process is associated with the disclosed robotic control system. At step 402, the process receives one or more (e.g., along X, Y, Z axes) imperfect measurements of the inertial property measured by an inertial sensor. The measurements can correspond to a rate of change of a velocity or a rate of change of an acceleration. Example of an inertial sensor include an accelerometer (for measuring linear acceleration) or a gyroscope (for measuring angular velocity). The inertial sensor can be attached to the robotic system, a handheld spatial controller, or it can be remotely located from the robotic system. In some embodiments, the process is initiated upon receiving an instruction/selection from a user via a graphical user interface (GUI). At step 404, the process receives user instruction to enable control of robotic system. At step 406, the process estimates low-frequency bias from the imperfect measurements. For example, the low-frequency bias can be estimated by passing the imperfect measurements (measured by the inertial sensor) though a dynamically-scaled moving average filter, a low-pass filter, or a Kalman filter. The signal measured by an inertial sensor can be affected by gravity. At step 408, the process passes the signal measured by the inertial sensor through a low-pass filter. The low-pass filter can attenuate disturbances in the signal measured by an inertial sensor. For example, a low-pass filter can use a percentage of the latest (most-recent) signal value and take the rest from the existing/previous values. In a way, this means that the filter remembers common values and thus smooths out uncommon values which most often are a result of noise. In some embodiments, the steps 408 and 410 can occur in a parallel or near parallel manner. The low-frequency bias estimation and high-frequency noise removal from the imperfect measurements can be applied (at step 410) in an additive or subtractive manner to generate a resultant signal. At step 412, the process determines whether the user instruction is to enable control of signal measured by the accelerometer. If the process determines that the user instruction to control input is "no," then the process sets the estimated change to zero and proceeds to step 416. A "yes" instruction implies that the user has activated the device running the disclosed control system and moved it spatially. If the process determines that the user instruction to control input is "yes," then the process rotates the resultant signal (e.g., the rate of change computed in step 410) into an inertial frame. The resultant signal is with respect to the reference frame of the spatial controller, but the inertial frame can be a coordinate frame that is stationary (with respect to the controlled robot's environment). This step is performed because the spatial controller itself could be rotating while moving, which would cause significant computation errors, if such movements are ignored. For example, if the spatial controller were moving at a constant velocity along a circular path, it would experience a constant acceleration along its y-axis (assuming it pointed toward the center of the circle). If the acceleration in the spatial controller's frame were integrated, it would indicate that the velocity along the y-axis is constantly increasing. In this example, a more accurate and helpful result is obtained from the perspective of a non-rotating inertial frame, i.e., a frame in which the velocity of the spatial controller has a fixed magnitude but rotating circularly at a constant rate. At step 416, the process integrates the resultant signal to generate a velocity or a position. In some embodiments, the process described in FIG. 4 is performed repetitively. Because the step of integration is sensitive to bias errors in the rate of change measurements, step 406 can prevent drift in the calculated final values of the inertial property. The calculated final values of the inertial property are an improved estimate (in comparison to traditional methods of solely integrating the signal values measured by an inertial sensor) that can be used as the input to an integrated position estimate algorithm (e.g., discussed in connection with FIG. 5). The velocity estimate and/or the position estimate can be used as control input for various robotic applications as described above (e.g., flying, ground mobile, or fixed). The process for accurately estimating the spatial velocity ends thereafter. Because the process above provides an accurate estimation of the spatial velocity of a signal, the process can be termed as an "inertial velocity filter" or "inertial change filter."

Figure 5:
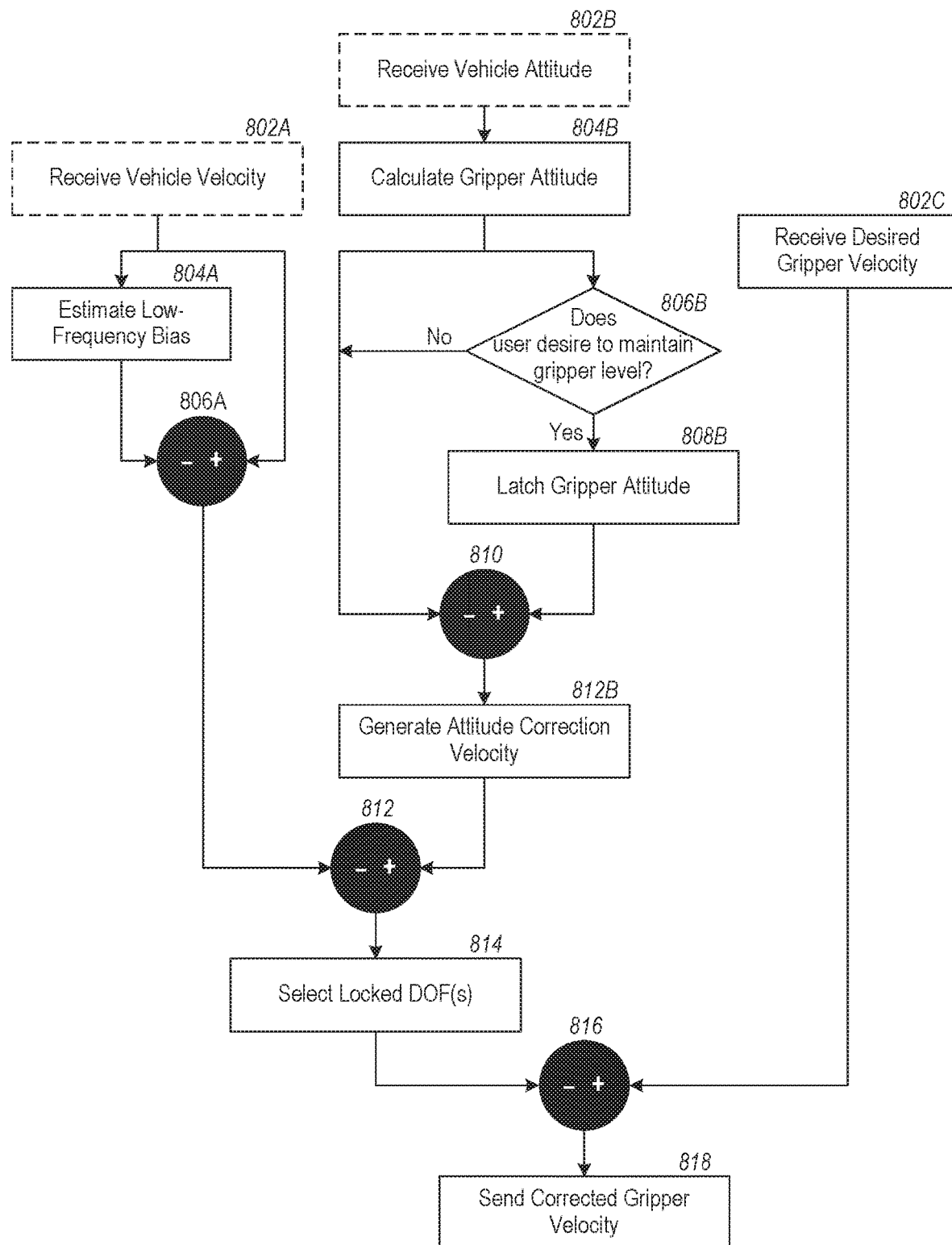
FIG. 5 is an example flowchart of a process for calculating velocity boundaries of movement of a spatial controller.

FIG. 5 is an example flowchart of a process for locking one or more degrees of freedom of an inertial reference frame. The process can be operative to receive input from one or more different sensors attached to a robot or a robotic arm. For example, steps in FIG. 5 shown ending with the letter "A" are based on the inertial gripper position lock use case (such as holding a door open while a wheelchair passed through) described in connection with FIG. 7A. Steps ending with the letter B are based on the inertial gripper tilt lock use case (such as holding a glass horizontally) described in connection with FIG. 7B. Several steps of the process can occur in a parallel or near parallel manner. Also, some steps can be optional depending on the specific use case to which the process is directed.

Steps 802A, 802B, 802C show data received from different sensors. For example, referring to the left-most branch of the process, in step 802A, the process receives vehicle velocity data from an inertial sensor located on the vehicle. (In some embodiments, the vehicle velocity data can be the outcome of the inertial motion estimation process described in connection with FIG. 4.) At step 804A, the process estimates low-frequency bias from the received vehicle velocity data. For example, the low-frequency bias can be estimated by passing the vehicle velocity data though a dynamically-scaled moving average filter, a low-pass filter, or a Kalman filter. At step 806A, the process removes the low-frequency bias from the received vehicle velocity data to generate a resultant signal. If the process receives no other types of sensor data, then the process moves to step 814 where it selects one or more locked degrees of freedom. However, if the process receives inputs from another sensor (e.g., vehicle attitude data as described in the middle branch of the process), then the process (additively or subtractively) uses the data from the outcome of this branch to generate a resultant signal at step 812, and then selects one or more locked degree of freedoms at step 814.

At step 814, the process, based on monitoring specific behaviors selects which degrees-of-freedom (DOFs) are to be locked in the inertial frame. For example, in the use case of holding open a door (FIG. 7A), three linear DOFs (i.e., along the X, Y, Z axes) would be locked to prevent the gripper from translating but allowing it rotate as necessary while the wheelchair moves through the opening. In the use case of holding a glass level (FIG. 7B) while being manipulated, two angular DOFs perpendicular to the vertical axis are locked. One advantage of the disclosed technology is that the selection of these DOFs can be made in any coordinate frame (e.g. the gripper frame or the inertial frame) by use of appropriate coordinate transforms.

Referring to the middle branch of the process, in step 802B, the process receives vehicle attitude data from an inertial sensor located on the vehicle. At step 804B, the process calculates gripper attitude from the vehicle attitude data. At step 806B, the process determines if the user desires to maintain the gripper level. For example, a user can interact with a user interface of a mobile app to select options corresponding to his/her desire of operation. If the process determines that the user has selected not to maintain gripper level, then the process moves to step 810. If, however, the process determines that the user has selected to maintain gripper level, then the process latches (step 808B) the attitude of the gripper, and generates (additively or subtractively at step 810) gripper attitude correction velocity (step 812B). The gripper attitude correction velocity is added subtractively or additively (at step 812) to the outcome of the signal from the left-most branch of the process to select one or more locked degrees of freedom at step 814.

Referring to the right-most branch of the process, the process receives (step 802C) desired gripper velocity and calculates (additively or subtractively at step 816 with the selected velocity correction) the corrected gripper velocity which is sent (step 818) to any of a robot, a robotic arm, or another process of the disclosed robotic control system. The process terminates thereafter.

Figure 6:
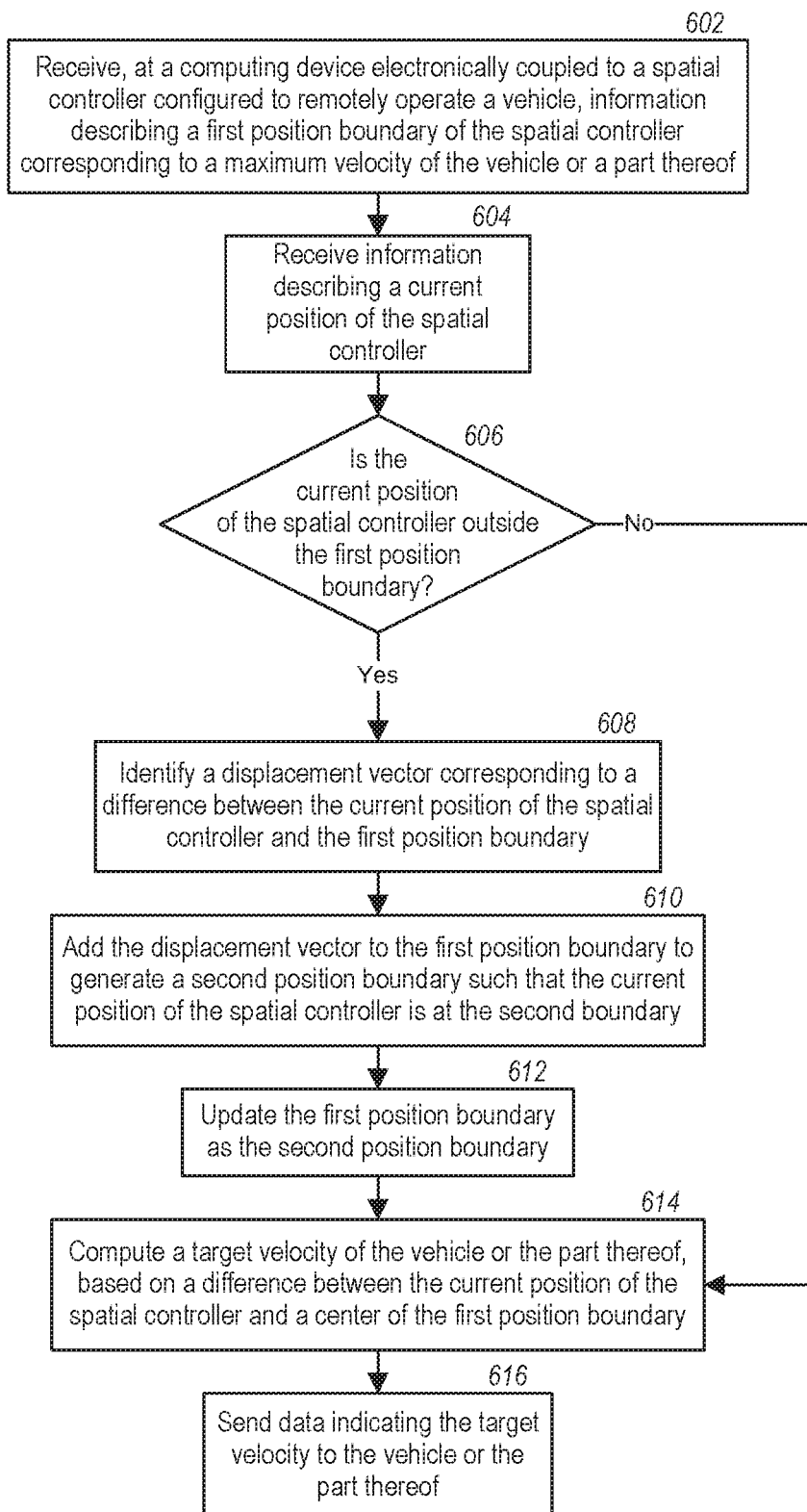
FIG. 6 is an example flowchart of a process for computing a sliding velocity limit boundary for a spatial controller.

FIG. 6 is an example flowchart of a process for computing a sliding velocity limit boundary for a spatial controller. Diagrammatic representations of the velocity limit boundary and associated concepts are described in connection with FIGS. 8A-8C. In these figures, a user or an operator expresses a desired velocity of a robot, a vehicle, a gripper, or a robotic arm by moving a spatial controller within a "virtual boundary" that represents the maximum magnitude of the desired velocity. In some instances, the desired velocity can be related to a portion/part of a robot, a vehicle, a gripper, a robotic arm. The spatial controller can be connected via a wired or a wireless connection to a computing device (e.g., a mobile device or a tablet computer)

that is configured to run the process. Based on the movement data from the spatial controller, the computing device can send commands or movement parameters to a remote robot, vehicle, or robotic arm electronically coupled to the computing device. At step 602, the process receives information describing a first position boundary of a spatial controller (e.g., a circle with a center corresponding to the spatial controller's initial rest position). At time t=0 (initial time), the first position boundary can correspond to a maximum velocity of the connected vehicle or portion thereof. The maximum velocity of the connected vehicle can be a user-defined quantity or based on manufacturer's specifications. For example, the maximum velocity can be a pre-calculated upper limit of the vehicle's velocity. Alternatively, the maximum velocity can be a velocity calculated to avoid a collision between the vehicle and an obstacle. In some instances, the maximum velocity can be a velocity calculated to avoid a restricted airspace or geographical zone. At step 604, the process receives a current position of the spatial controller. At step 606, the process determines whether or not the spatial controller is outside the first position boundary. Upon determining that the spatial controller is not outside (i.e., within) the first position boundary, the process computes (at step 614) a target velocity of the vehicle based on a difference between the current position of the spatial controller and a point lying at the center of the first position boundary. Because the spatial controller is within the first position boundary, the process does not change the first position boundary of the spatial controller. At step 616, the process sends the computed target velocity to the vehicle, which causes the vehicle to move in accordance with the target velocity.

At step 606, if the process determines that the spatial controller is outside the first position boundary, then the process identifies a displacement vector based on a difference between the current position of the spatial controller and the first position boundary. At step 610, the process adds the displacement vector to (e.g., the center) of the first position boundary to generate a second boundary such that the current position of the spatial controller corresponds to the second boundary. At step 612, the process updates the first position boundary as the second position boundary. At step 614, the process computes a target velocity of the vehicle based on a difference between the current position of the spatial controller and a point lying at the center of the first position boundary. For example, the target velocity can be computed by multiplying the difference by a constant gain value (e.g. 2). At step 616, the process sends data indicating the computed target velocity (as an instruction or a command) to the vehicle, which causes the vehicle to move in accordance with the target velocity. Because the first position boundary defines the velocity expressed by the spatial controller, the first position boundary can be referred to as a velocity limit boundary and the velocity limit boundary is considered to be a "sliding velocity limit boundary."

In some embodiments, the current position of the spatial controller, the first position boundary, and the second position boundary can be expressed in 1-dimensional, 2-dimensional, or 3-dimensional space. In some embodiments, the calculation of target velocity can be based on the difference between the current position of the spatial controller and the point at the center of the first position boundary by considering a deadband boundary and setting the target velocity to zero if the position of the spatial controller is within the deadband boundary. If, after the first position boundary is updated (step 612), the spatial controller is moved back inside the first position boundary, then the first position boundary is not moved (i.e., the condition in step 606 will be false).

It will be understood that several steps of the process can occur in a parallel or near parallel manner. Also, some steps can be optional depending on the specific use case to which the process is directed.

Figure 7A:
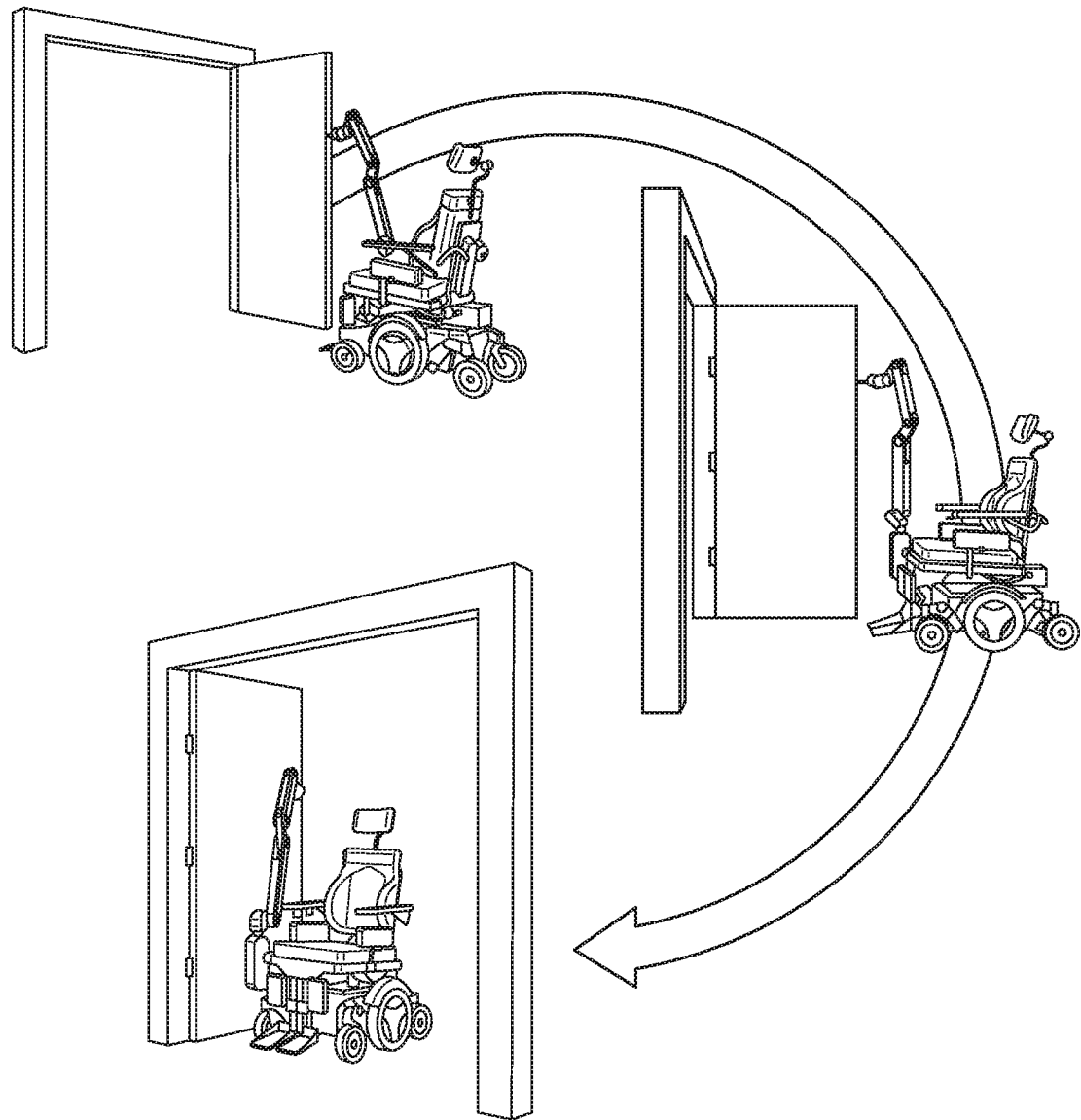
FIG. 7A is an example use case of application of the inertial lock process described in FIG. 5.

FIG. 7A is another example use case of application of the inertial lock process described in FIG. 5. For example, FIG. 7A shows the process applying an "inertial hold" or engaging an "inertial lock" on the linear (translation) degrees of freedom to facilitate a complex movement such as keep holding a door open while a wheelchair passes through the doorway. (In some embodiments, the wheelchair can be the wheelchair arrangement described in connection with FIG. 1A.) This "inertial hold" feature allows the manipulator to perform "dead reckoning" without other inputs from the system to which it is attached. This feature can be particularly useful when that system does not have an ability to measure its location (i.e. a manual wheelchair). With the gripper is positioned at the door knob, the robotic manipulator arm can be used to first open the door and keep holding the door open. The inertial hold can be applied by means of the inertial hold filter described in FIG. 5. One advantage of the disclosed process is evident: the manipulator receives no direct control signals or telemetry signals from the wheelchair. This implies that the manipulator can cancel out movements at its base such that it can hold or stabilize itself or an object. Thus, the process can utilize inaccurate or coarse signal measurements from inexpensive, commercial-grade inertial sensors to calculate the (final) velocity of the wheel chair (and the robotic arm) and provide control instructions such that the gripper stays "fixed" in space while the wheelchair moves through the doorway. This allows the operator to lock specific degree(s)-of-freedom (DOF) in the inertial frame.

Figure 7B:
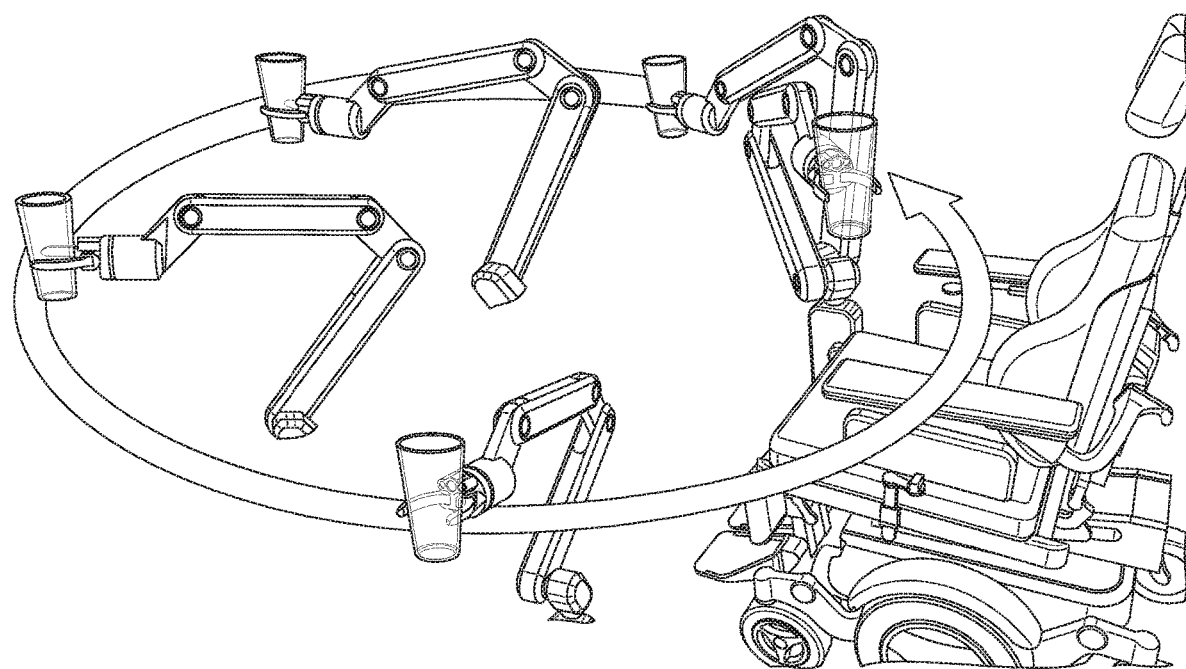
FIG. 7B is another example use case of application of the inertial lock process described in FIG. 5.

FIG. 7B is an example use case of application of the inertial lock process described in FIG. 5. For example, FIG. 7B shows the process applying an "automatic level control" by applying an "orientation lock" in the horizontal plane on the angular (rotational) degrees of freedom of the robotic arm to prevent the open container from spilling the liquid. In some embodiments, the robotic arm manipulator can be controlled by a mobile device operated by a user on a wheelchair. (In some embodiments, the wheelchair can be the wheelchair arrangement described in connection with FIG. 1A.) In some embodiments, the robotic manipulator arm is autonomously controlled (without manual involvement). The "orientation lock" is enabled by sensing gravity at the base of the robotic manipulator arm. Thus, one advantage of the disclosed technology is evident: the robotic manipulator arm reacts to disturbances (someone bumps the wheelchair) at its base and cancels out the movement to prevent spilling of the liquid from the open container. Even when there are no disturbances, e.g., the wheelchair is located on an incline of unknown magnitude or direction, the robotic manipulator arm may not be aware of which way gravity is acting on itself. The gripper can be oriented in a manner to eliminate or minimize spilling of the liquid in the open container. This includes "semi-autonomous" lead in to grasp the containers, having the gripper start parallel to gravity.

Figure 8A:
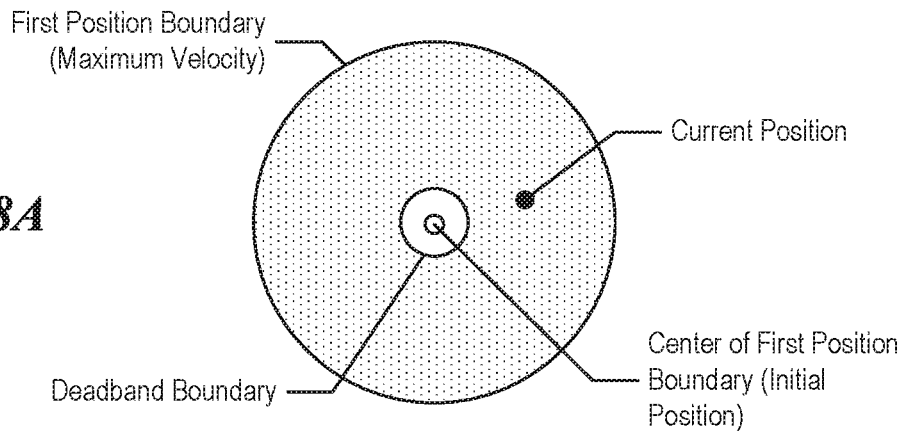
FIGS. 8A-8C show diagrammatic representations of velocity limit boundaries of a spatial controller.
Figure 8B:
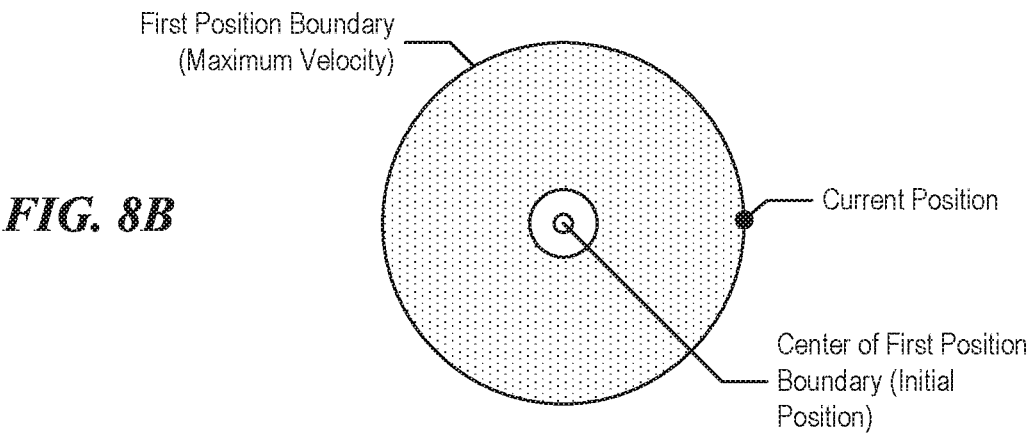
Figure 8C:
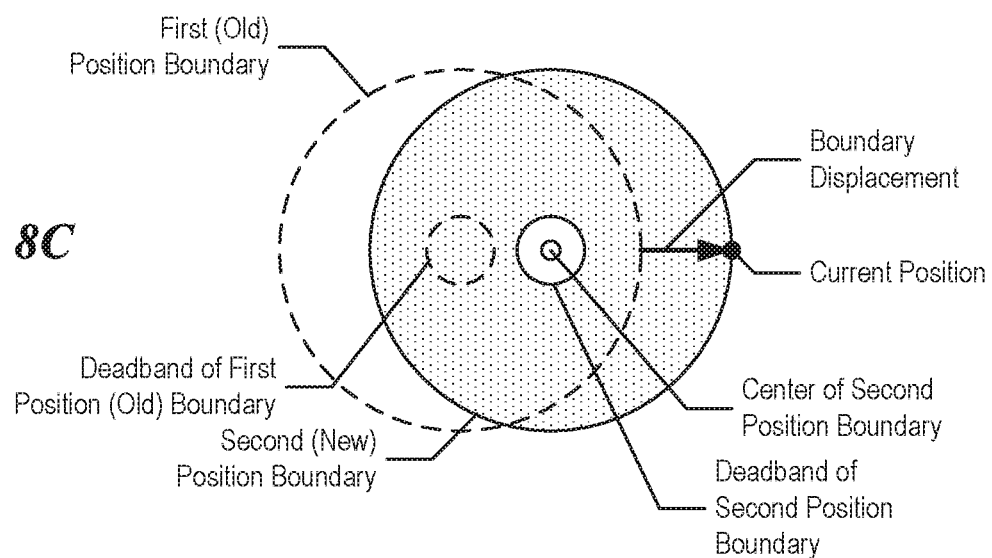

FIGS. 8A-8C show diagrammatic representations of velocity limit boundaries of a spatial controller, e.g., operating in a velocity mode. When mapping the position of a spatial controller to the velocity command(s) transmitted by the spatial controller to a robot, there is a boundary of position displacement equivalent to a maximum velocity command. This 3-dimensional boundary is termed first position boundary, in FIG. 8A. The first position boundary can also be referred as the velocity limit boundary or the boundary corresponding to the maximum velocity. As the spatial controller is moved (by an operator) from an initial rest position and past a deadband boundary, the robot operated by commands from the spatial controller accelerates from rest to the commanded velocity. In FIG. 8A, the spatial controller is located within the first position boundary. Upon reaching the first position boundary, if the spatial controller is moved in the opposite direction towards its rest position, the robot immediately decelerates to the new commanded velocity. FIGS. 8A-8C also show a deadband boundary defining an outer extent of a deadband region. The deadband region is a region within which the robot does not move (i.e., the robot has zero velocity) even though the spatial controller is moved. The size of the deadband region depends on the accuracy of the inertial sensors. In some embodiments, the size of the deadband region is small. As shown in FIGS. 8A-8C, the current position of the spatial controller is shown as a dot moving towards the velocity limit boundary from the rest position at the center of the circle (termed velocity center in FIG. 8A). Anywhere outside the deadband region, the spatial movement/displacement of the spatial controller produces a corresponding velocity command to be sent to the robot or the vehicle.

FIG. 8B shows the spatial controller at the first position boundary. FIG. 8C shows what happens to the velocity limit boundary when the spatial controller is moved past the (old) velocity limit boundary. FIG. 8C shows that the 3-dimensional boundary moves along with the spatial controller. The dotted circles in FIG. 8C represent the first position (old) boundary and the deadband of the first position (old) boundary. The solid circles in FIG. 8C represent the second position (new) boundary and its corresponding center (i.e., center of second position boundary). FIG. 8C also shows the boundary displacement (e.g., based on displacement of the velocity center) when the spatial controller moves/slides past the first position boundary. An example flowchart of a process for calculating boundaries of movement of a spatial controller is discussed in connection with FIG. 6.

Figure 9A:
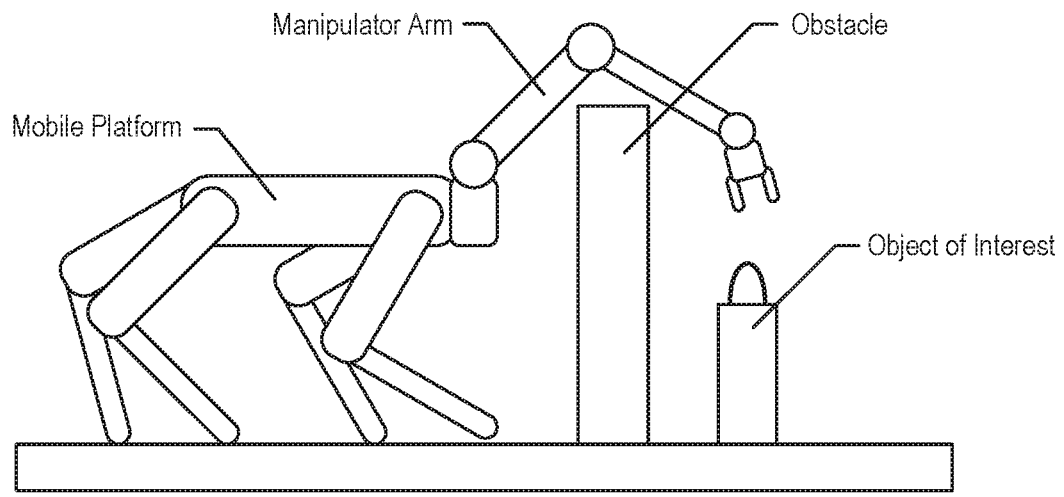
FIGS. 9A and 9B show example use cases of applications of increasing the workspace of the manipulation system by using the mobility of the host vehicle.
Figure 9B:
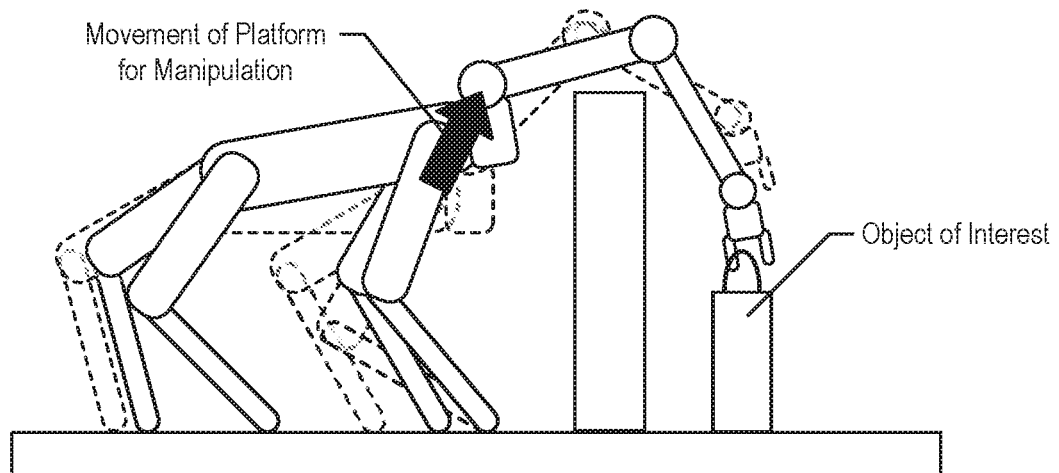

FIGS. 9A and 9B show example use cases of applications of increasing the workspace of the manipulation system. In some embodiments, the disclosed control system can use the mobility of the platform with the manipulator arm(s) to increase the workspace of the manipulation system. For example, as shown in FIGS. 9A and 9B, a manipulator arm mounted on a legged ground robot grasps an object that would normally be out of reach by automatically using the mobility of the robot to raise its body. The use of the mobility of the platform with the manipulator arm(s) is managed by the disclosed robotic control system. As another example, the robotic control system associated with a multi-rotor flying robot can use the mobility of the 3 degree-of-freedom (DOF) manipulator arm to allow full 6-DOF control of an object attached to the manipulator arm.

Figure 10A:
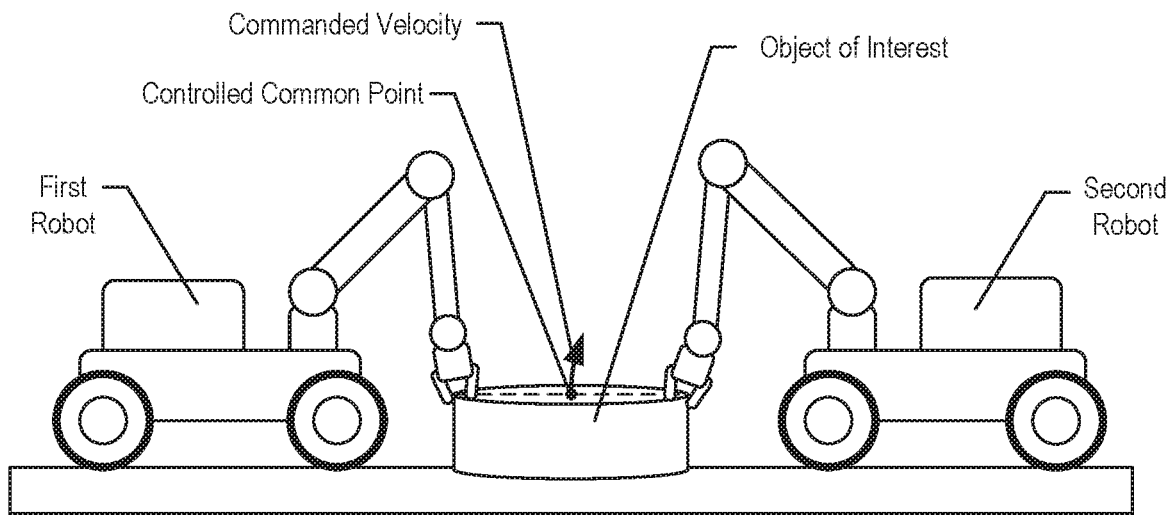
FIGS. 10A and 10B show an example use case of a single-controller coordinated manipulation.
Figure 10B:
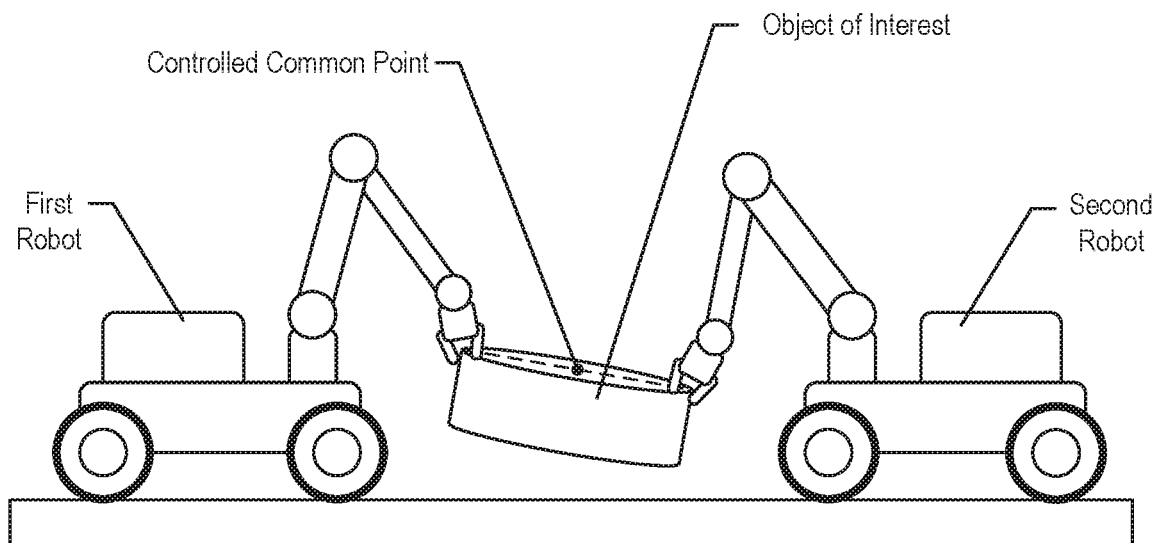

FIGS. 10A and 10B show an example use case of coordinated manipulation by a single-controller. The controller (such as a spatial controller) is able to singly control the end-effectors of two or more manipulators mounted on separate robotic platforms by sending commands to a common point (e.g. the midpoint between two grippers on the manipulators). As a result of this coordinated manipulation, a single spatial controller can be used to command two ground robots with manipulator arms to lift an object that would otherwise be too heavy for each individual robot to lift.

Figure 11A:
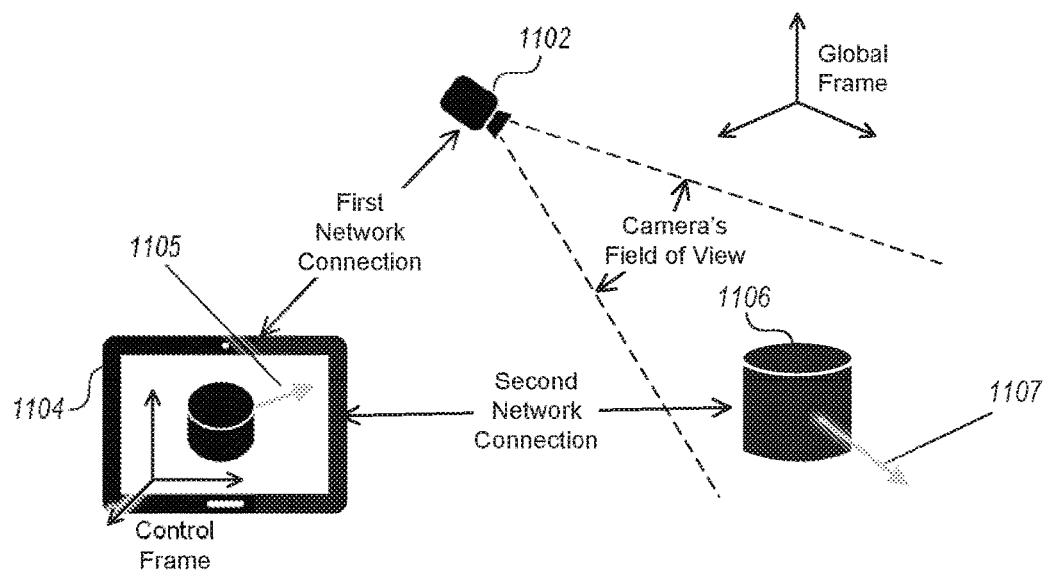
FIGS. 11A-11D illustrate example use cases of teleoperation of a vehicle located in the field of view of a camera.

FIGS. 11A-11D illustrate example use cases of teleoperation (also referred to herein as third person teleoperation) using a remote camera. In these use cases, the disclosed robotic control system can operate/control a first vehicle (or a portion thereof) from the perspective of a camera that keeps the vehicle in view. For example, FIG. 11A shows a generic overview of teleoperation of the vehicle. In FIG. 11A, vehicle (or a portion thereof) 1106 can either move or remain stationary. Vehicle 1106 is in the field of view of camera 1102. The position of the vehicle and the position of the camera can be with reference to a global reference frame, e.g., the Earth's reference frame using altitude, latitude, and longitude. Direction 1107 is a direction of motion of vehicle 1106 with respect to the global reference frame. A user can view vehicle 1106 (and its movements) in real time or near real time on the user interface displayed on computing device 1104. Desired direction 1105 (displayed on computing device 1104) corresponds to direction 1107 of the movement of vehicle 1106. In some embodiments, desired direction 1105 is represented with respect to a control frame of the user interface (or, alternatively the user interface reference frame). In some embodiments, camera 1102 can provide (via a first network connection) information of its position to computing device 1104 and a live video feed of vehicle 1106. In some embodiments, vehicle 1106 provides information of its location to computing device 1104 via a second network connection. Either the first network connection or the second network connection (or, both) can include a wired connection (e.g., using Ethernet or USB) or a wireless connection (e.g., Wifi, WiMax, Bluetooth, or short range radio). Thus, at least one advantage of the present technology is that the disclosed robotic control system configured to run on computing device 1104 allows teleoperation of vehicle 1106. The disclosed robotic control system that allows teleoperation can be configured to run on computing device 1104.

Figure 11B:
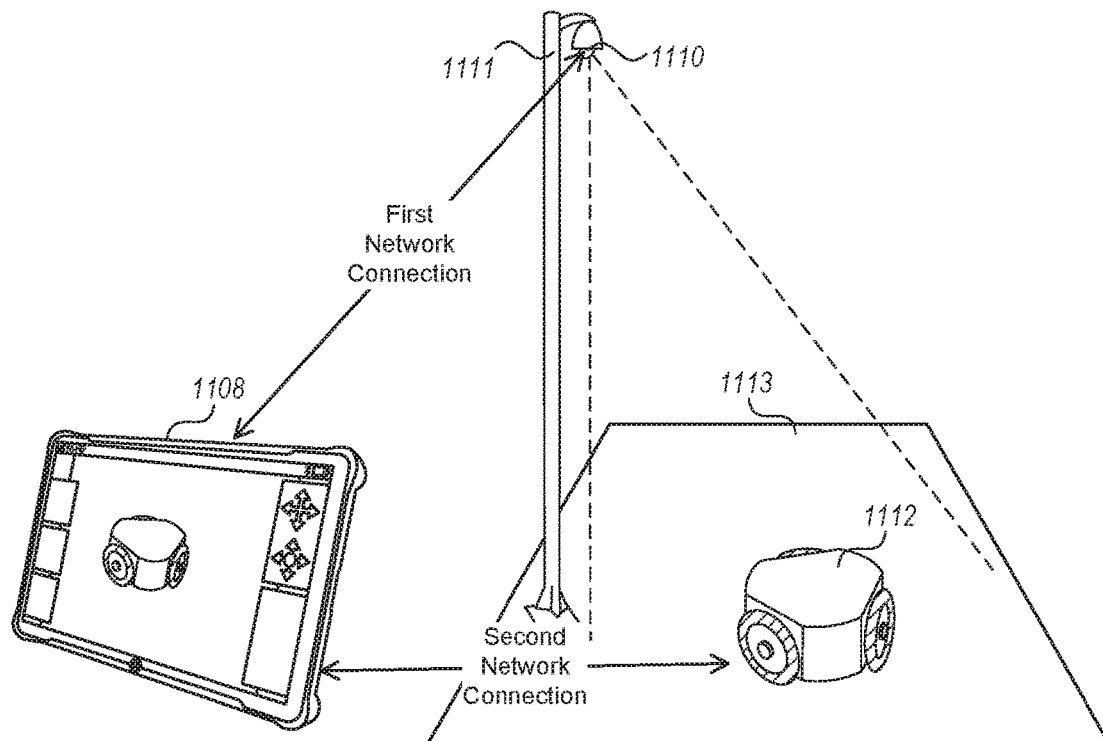

FIG. 11B shows a first use case of teleoperation. In FIG. 11B, camera 1110 is shown as a stationary camera that is mounted on pole 1111 and vehicle 1112 is shown as a ground vehicle located on Earth's surface 1113. Camera 1110 provides information of its position to computing device 1108 and a live video feed of vehicle 1112 via a first network connection. Advantageously, from the perspective of remote camera 1110, the desired direction (displayed on computing device 1108) corresponds to direction of the movement of vehicle 1112. Vehicle 1112 provides information of its location to computing device 1108 via a second network connection. Commands (e.g., for movement) of vehicle 1112 can be provided using a graphical user interface (GUI) displayed on computing device 1108. For example, a user can move directional arrows on the GUI to indicate movement of vehicle 1112. These commands are sent to vehicle 1112 via the second network connection. Accordingly, vehicle 1112 can move based on the commands. The disclosed robotic control system that allows teleoperation can be configured to run on computing device 1108.

Figure 11C:
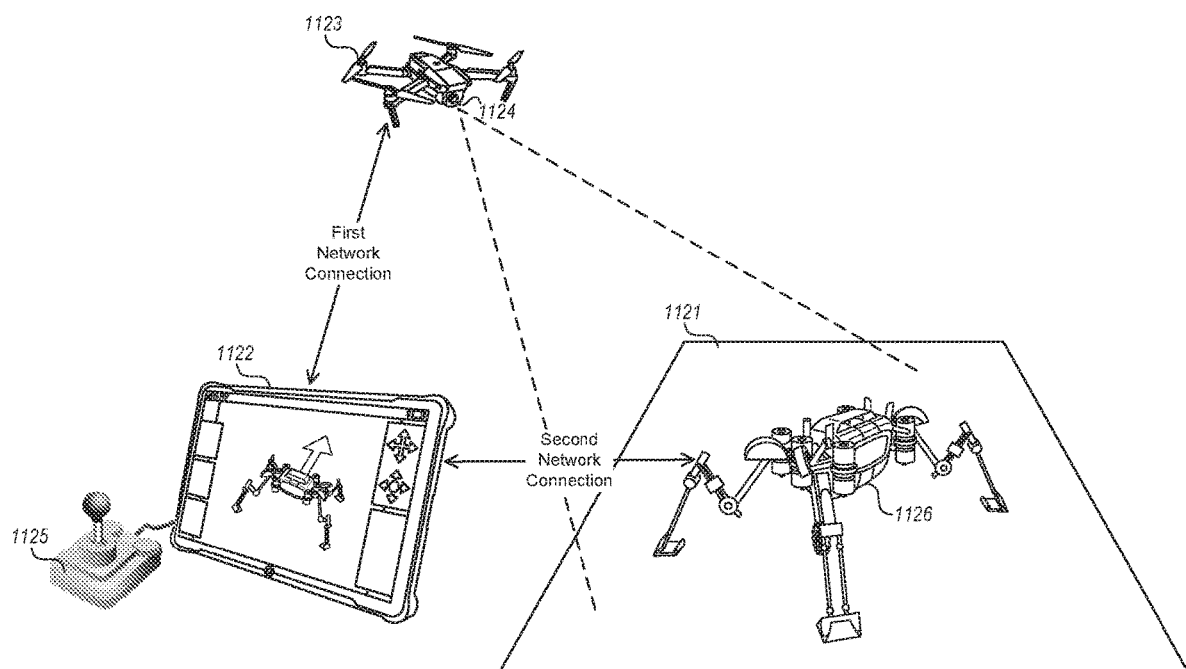

FIG. 11C shows a second use case of teleoperation. In FIG. 11C, camera 1124 is shown as included on robot 1123 which is an unmanned aerial vehicle. Robot 1123 can hover and/or fly in a manner such that legged robot 1126 is automatically in the field of view of camera 1124. Camera 1124 provides information of its position to computing device 1122 and a live feed of legged robot 1126 via a first network connection. Advantageously, from the perspective of remote camera 1124, the desired direction (displayed on computing device 1122) corresponds to direction of the movement of legged robot 1126. Legged robot 1126 located on Earth's surface 1121 provides information of its location to computing device 1122 via a second network connection. A user can move joystick 1125 electronically attached to computing device 1122 to specify movement of vehicle 1112. The movements made via joystick 1125 are received at computing device 1122 and electronically converted into commands or instructions at computing device 1122. The commands or instructions are sent to legged robot 1126 via the second network connection. Accordingly, legged robot 1126 can move based on the commands. The disclosed robotic control system that allows teleoperation can be configured to run on computing device 1122.

Figure 11D:
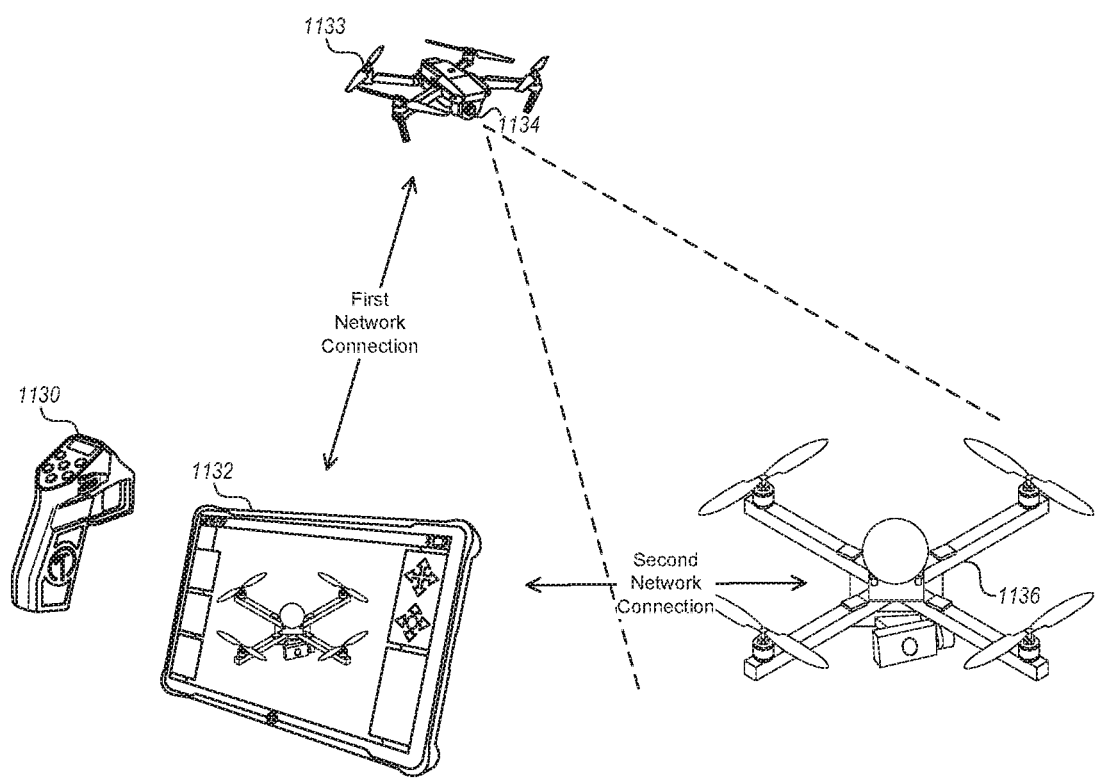

FIG. 11D shows a third use case of teleoperation. In FIG. 11D, camera 1134 is shown as included on robot 1133 which is an unmanned aerial vehicle. Robot 1133 can hover and/or fly in a manner such that unmanned vehicle 1136 is automatically in the field of view of camera 1134. Camera 1134 provides information of its position to computing device 1132 and a live video feed of unmanned vehicle 1136 via a first network connection. Advantageously, from the perspective of remote camera 1134, the desired direction (displayed on computing device 1132) corresponds to direction of the movement of legged robot 1136. Unmanned vehicle 1136 can be located on the ground or in air. Unmanned vehicle 1136 can provide information of its location to computing device 1132 via a second network connection. A user can move a spatial controller (e.g., spatial controller 1130) electronically attached to computing device 1130 to specify movement of unmanned vehicle 1136. The movements of spatial controller 1130 are electronically converted into commands or instructions at computing device 1122 which are then are sent to unmanned vehicle 1136 via the second network connection. Accordingly, unmanned vehicle 1136 can move on the ground or in air based on the commands. The disclosed robotic control system that allows teleoperation can be configured to run on computing device 1132.

Figure 12:
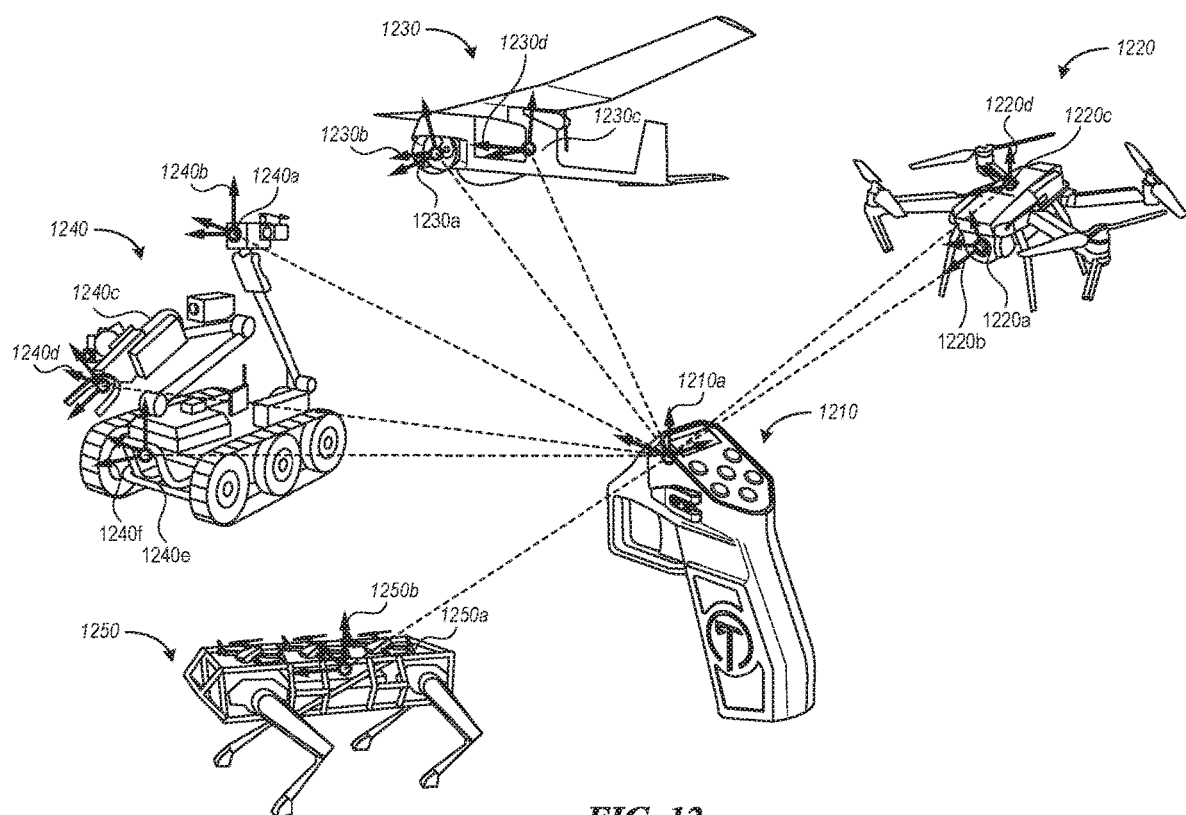
FIG. 12 shows a conceptual diagram illustrating examples of teleoperation for different types of vehicles.

FIG. 12 shows a conceptual diagram illustrating examples of teleoperation for different types of vehicles. One or more of the vehicles can be independently controlled by a spatial controller. For example, spatial controller 1210 (having a reference frame denoted 1210a) can independently control one or more of: a multi-rotor vehicle 1220, an unmanned aerial vehicle 1230, a ground vehicle 1240, or a legged robot 1250. The vehicles shown in FIG. 12 can have a camera mounted on the body of the vehicle. The spatial controller can independently control movement of the camera and/or the body of a given vehicle. Thus, the movement of the spatial controller can be converted into movement of the camera mounted on a vehicle and also a movement of the body of the vehicle. Controlling movement of the camera may not have any relationship to controlling movement of a body part of a vehicle. For example, multi-rotor vehicle 1220 includes a camera 1220b and a body 1220c. A reference frame of camera 1220a is denoted as 1220b. A reference frame of body 1220c of multi-rotor vehicle 1220 is denoted as 1220d. Unmanned aerial vehicle 1230 includes a camera 1230a (having a frame of reference denoted 1230b) and a body 1230c (having a frame of reference denoted 1230d). Ground vehicle 1240 includes a first body part 1240c (having a frame of reference denoted 1240d) and a second body part 1240e (having a frame of reference denoted 1240f). Camera 1240a (having a frame of reference denoted 1240b) is mounted on ground vehicle 1240. In some embodiments, spatial controller 1210 can independently control movement of camera 1240a, movement of first body part 1240c (such as a manipulator arm attached to vehicle 1240), and/or movement of second body part 1240f. Legged robot 1250 includes a body 1250 (having a frame of reference denoted 1250b). Advantageously, the disclosed robotic control system (e.g., configured to run on an input device connected to spatial controller 1210) can perform appropriate transformations of commands and translations of reference frames associated with movement of a camera, a body of a vehicle, or a part of a body of a vehicle.

Figure 13:
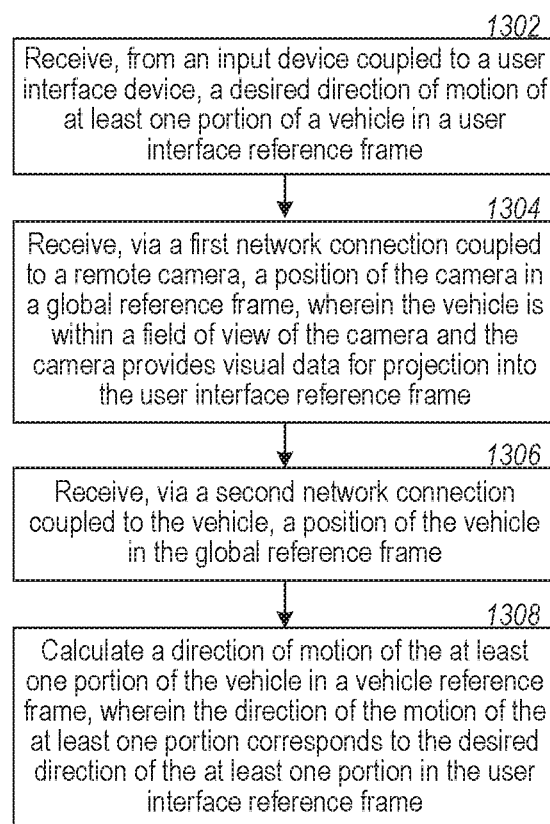
FIG. 13 is an example flowchart of a process for teleoperating a vehicle using a remote camera.

FIG. 13 is an example flowchart of a process for teleoperating a vehicle. At step 1302, the process receives, from an input device coupled to a user interface device, a desired direction of motion of at least one portion of a vehicle in a user interface reference frame. At step 1304, the process receives, via a first network connection coupled to a remote camera, a position of the camera in a global reference frame, wherein the vehicle is within a field of view of the camera and the camera provides visual data (e.g., images and/or video in a suitable digital format) for projection into the user interface reference frame. In some embodiments, the position of the camera can be defined using 6 degrees-of-freedom such as latitude, longitude, altitude, roll, pitch, and heading. In some embodiments, the camera can be pointed at the vehicle, or the camera can follow the vehicle in real time. At step 1306, the process receives, via a second network connection coupled to the vehicle, a position of the vehicle in the global reference frame. At step 1308, the process calculates a direction of motion of the at least one portion of the vehicle in a vehicle reference frame, wherein the direction of the motion of the at least one portion corresponds to the desired direction of the at least one portion in the user interface reference frame. In some embodiments, the vehicle reference frame can be a global reference frame, depending on a type of vehicle. For example, some vehicles accept velocity commands in a global frame (e.g. X=North, Y=East, Z=Down). It will be understood that several steps of the process can occur in a parallel or near parallel manner. Also, some steps can be optional depending on the specific use case to which the process is directed.

In some embodiments, spatial teleoperation of a vehicle can be implemented using various modes. For example, a vehicle's velocity can be expressed as moving in accordance with a traverse mode, a reorient mode, or a manipulate mode. In a traverse mode, the planar velocity of the body of the vehicle with respect to the ground (e.g., including a translation over XY plane on the ground and a rotation about a vertical Z axis) is proportional to angular displacement of the spatial controller controlling the vehicle. For example, an operator can select a traverse mode to move a vehicle on the ground along a curving roadway. In a reorient mode, the velocity (linear and angular) of the vehicle body with feet planted on the ground is proportional to the linear and/or angular velocity of the spatial controller. For example, an operator of a vehicle can use a reorient mode to aim a camera mounted on the body of the vehicle to get a better view of an object. In a manipulate mode, the velocity of one leg of the vehicle is proportional to the linear and/or angular velocity of the spatial controller, without movement of ends of other legs of the vehicle. For example, an operator can select a manipulate mode to use one leg of a legged vehicle (robot) to unlatch and open a closed door. In some embodiments, a vehicle can be operated in more than one mode successively. For example, an operator could use a reorient mode to lower a vehicle to allow it to pass under an obstacle and then use a traverse mode to move the vehicle under the obstacle.

FIGS. 14A-14D are example illustrations showing a traverse mode of teleoperating a legged vehicle. For example, when walking, the body of the vehicle 1400 in FIG. 14A can move horizontally over the ground and can rotate about a vertical Z axis while the legs move with respect to the ground. The horizontal motion and the rotational motion can be independent of one another. As an example, these motions can be commanded using angular movement of a spatial controller (e.g., spatial controller 1406) shown in FIG. 14B. The spatial controller generates an angular displacement 1404 (e.g. represented in a global reference frame 1402) which is converted into horizontal and/or rotational movement of vehicle 1400. Movement of vehicle 1400 can be defined with respect to vehicle reference frame 1450.

Figure 14A:
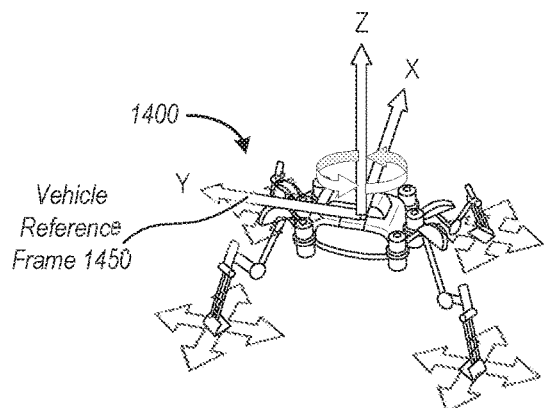
FIGS. 14A-14D are example illustrations showing a traverse mode of teleoperating a legged vehicle.
Figure 14B:
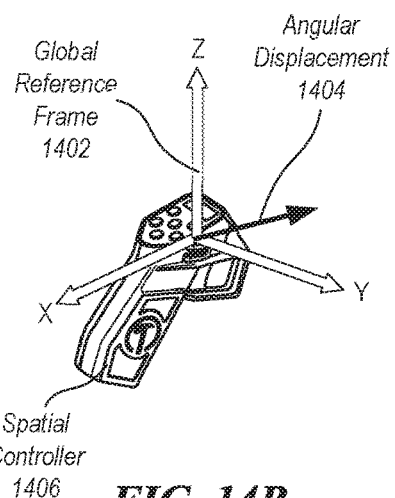
Figure 14C:
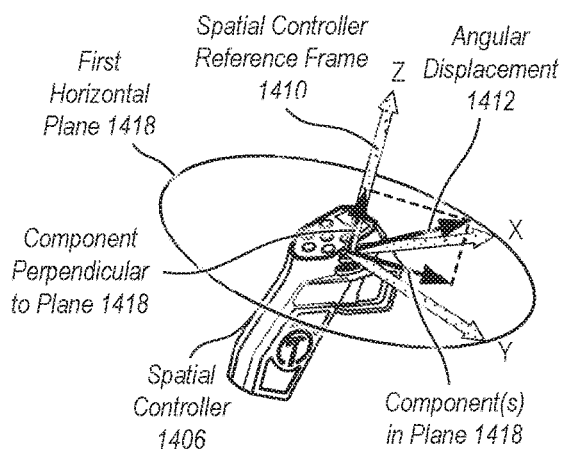
Figure 14D:
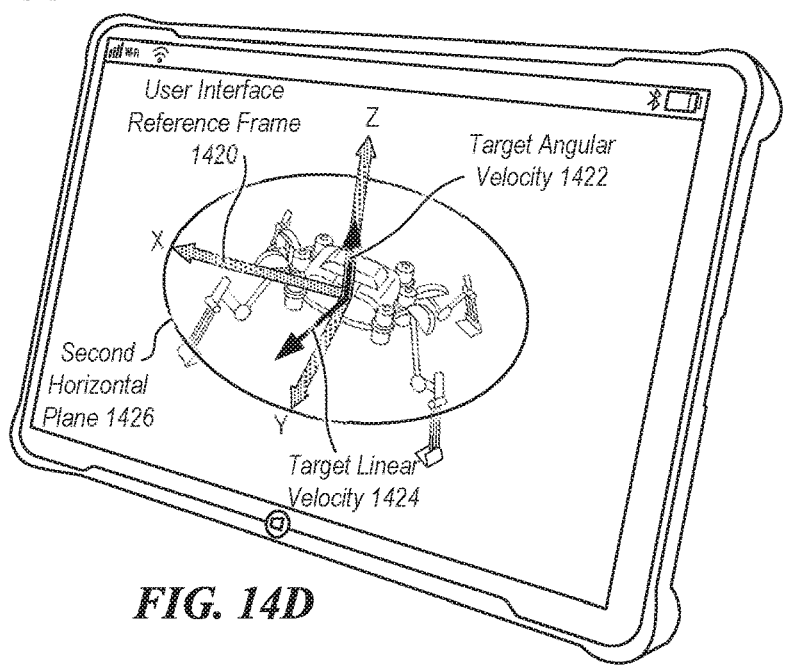

In FIG. 14C, angular displacement 1412 of spatial controller 1406 is represented using spatial controller reference frame 1410. Spatial controller reference frame 1410 includes first horizontal plane 1418. Angular displacement 1412 has a component in first horizontal plane 1418 and a component perpendicular to first horizontal plane 1418. FIG. 14D shows a view (e.g., a live video feed obtained by a camera that has vehicle 1400 in its field of view) of vehicle 1400 on a computing device. The computing device includes user interface reference frame 1420. User interface reference frame 1420 includes second horizontal plane 1426. In some embodiments, the disclosed robotic control system (configured to run on computing device) computes target linear velocity 1424 and target angular velocity 1422 of vehicle 1400. Target linear velocity 1424 and target angular velocity 1422 of vehicle 1400 can be computed with respect to spatial controller reference frame 1410 and then suitably transformed into vehicle reference frame 1450. As a result, vehicle 1400 can move horizontally and/or rotationally in accordance with target linear velocity 1424 and target angular velocity 1422.

FIGS. 15A-15D are example illustrations showing a reorient mode of teleoperating a legged vehicle. For example, the ends of the legs of the vehicle (e.g., vehicle 1500) in FIG. 15A do not move (i.e., they are stationary). However, the upper part of the body of the vehicle can have a linear motion and/or a angular motion. The linear motion and the angular motion can be independent of one another. As an example, these motions can be commanded using linear movement and/or angular movement of a spatial controller (e.g., spatial controller 1506) shown in FIG. 15B. Spatial controller generates linear velocity 1504 and angular velocity 1508 (e.g. both represented in global reference frame 1502) which is mapped into linear and/or angular velocity of vehicle 1500.

Figure 15A:
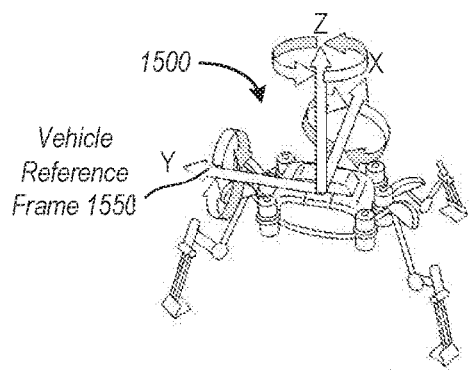
FIGS. 15A-15D are example illustrations showing a reorient mode of teleoperating a legged vehicle.
Figure 15B:
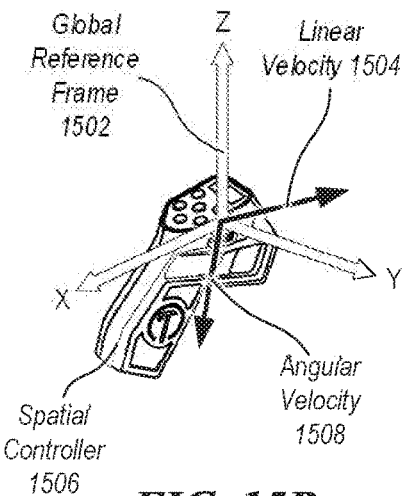
Figure 15C:
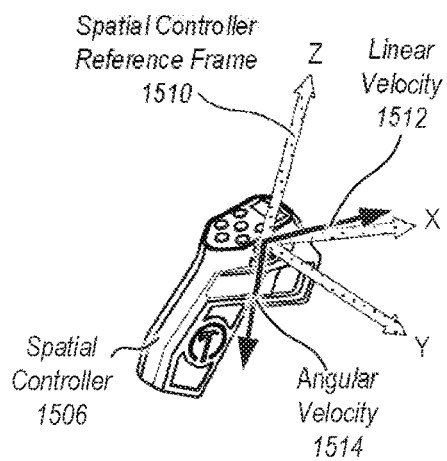
Figure 15D:
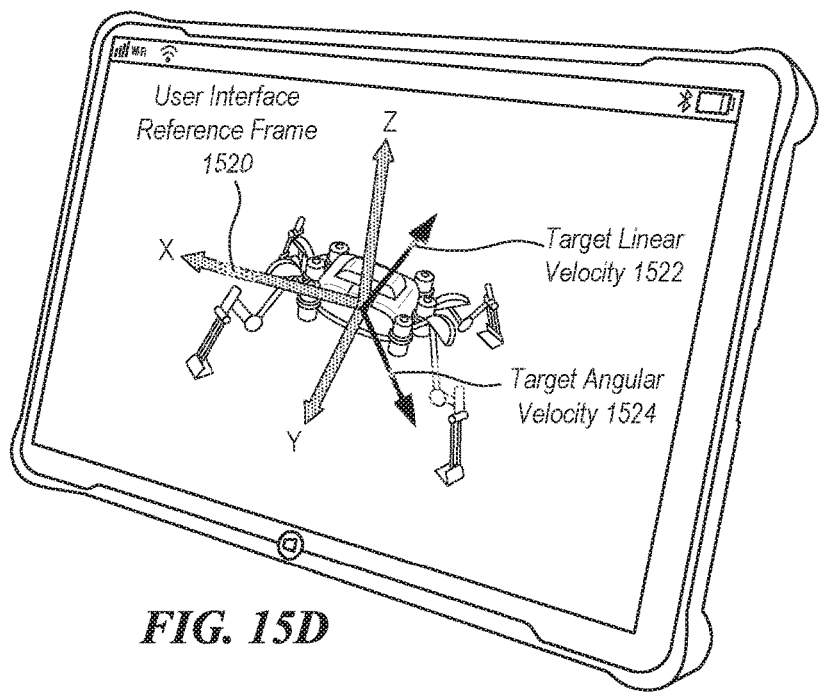

In FIG. 15C, linear velocity 1512 and angular velocity 1514 of spatial controller 1506 are represented using spatial controller reference frame 1510. FIG. 15D shows a view (e.g., a live video feed obtained by a camera that has vehicle 1500 in its field of view) of vehicle 1500 on a computing device. The computing device includes user interface reference frame 1520. In some embodiments, the disclosed robotic control system (configured to run on computing device) computes target linear velocity 1524 and target angular velocity 1522 of vehicle 1500. Target linear velocity 1524 and target angular velocity 1522 of vehicle 1500 can be computed with respect to spatial controller reference frame 1510 and then suitably transformed into vehicle reference frame 1550. As a result, vehicle 1500 can move horizontally and/or rotationally in accordance with target linear velocity 1524 and target angular velocity 1522.

FIGS. 16A-16D are example illustrations showing a manipulate mode of teleoperating a vehicle. In this mode, movement of at least one leg of the vehicle is caused without movement of ends of other legs of the vehicle. Depending on the kinematics of legged vehicle 1600, the teleoperated leg can have up to 6 degrees-of-freedom (DOF). As an example, these motions can be commanded using linear movement and/or angular movement of a spatial controller (e.g., spatial controller 1606) shown in FIG. 16B. Spatial controller generates linear velocity 1604 and angular velocity 1608 (e.g. both represented in global reference frame 1602) which will be mapped into linear and/or angular velocity of the teleoperated leg of vehicle 1600.

Figure 16A:
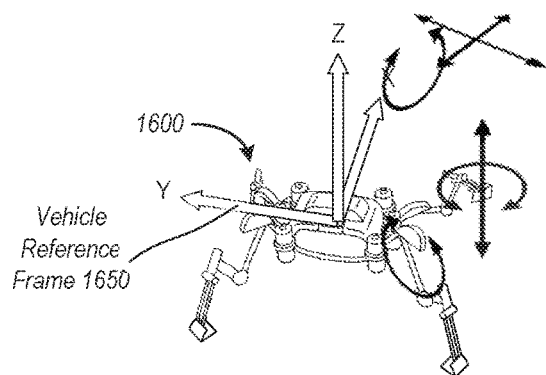
FIGS. 16A-16D are example illustrations showing a manipulate mode of teleoperating a legged vehicle.
Figure 16B:
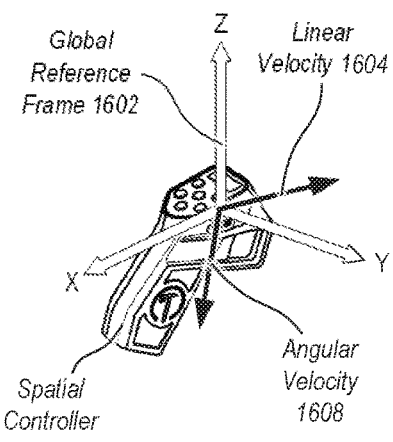
Figure 16C:
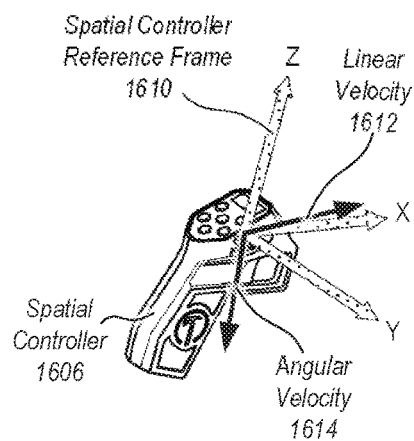
Figure 16D:
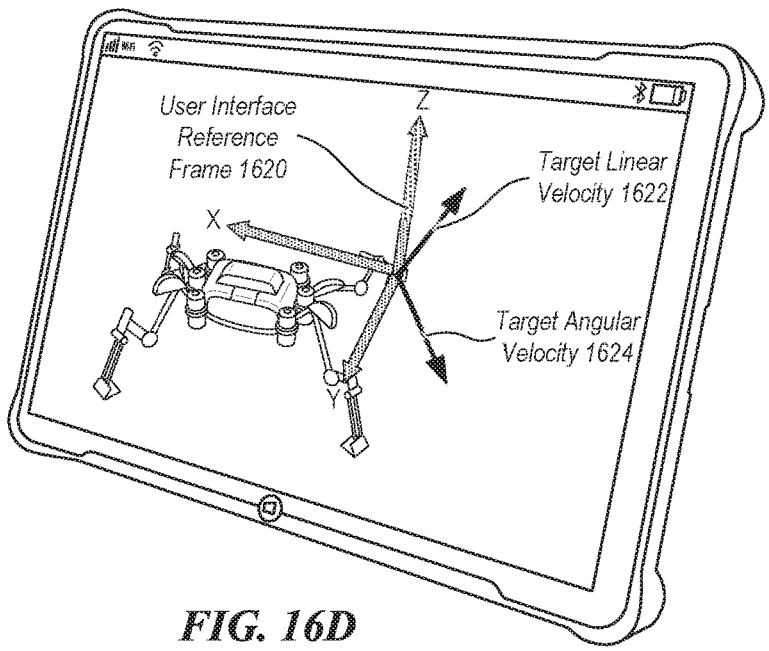

In FIG. 16C, linear velocity 1612 and angular velocity 1614 of spatial controller 1606 are represented using spatial controller reference frame 1610. FIG. 16D shows a view (e.g., a live video feed obtained by a camera that has vehicle 1600 in its field of view) of vehicle 1600 on a computing device. The computing device includes user interface reference frame 1620. In some embodiments, the disclosed robotic control system (configured to run on computing device) computes target linear velocity 1624 and target angular velocity 1622 of the teleoperated leg of vehicle 1600. Target linear velocity 1624 and target angular velocity 1622 of vehicle 1600 can be computed with respect to spatial controller reference frame 1610 and then suitably transformed into vehicle reference frame 1650. As a result, vehicle 1600 can move the teleoperated leg in up to 6 DOF in accordance with target linear velocity 1624 and target angular velocity 1622.

Figure 17:
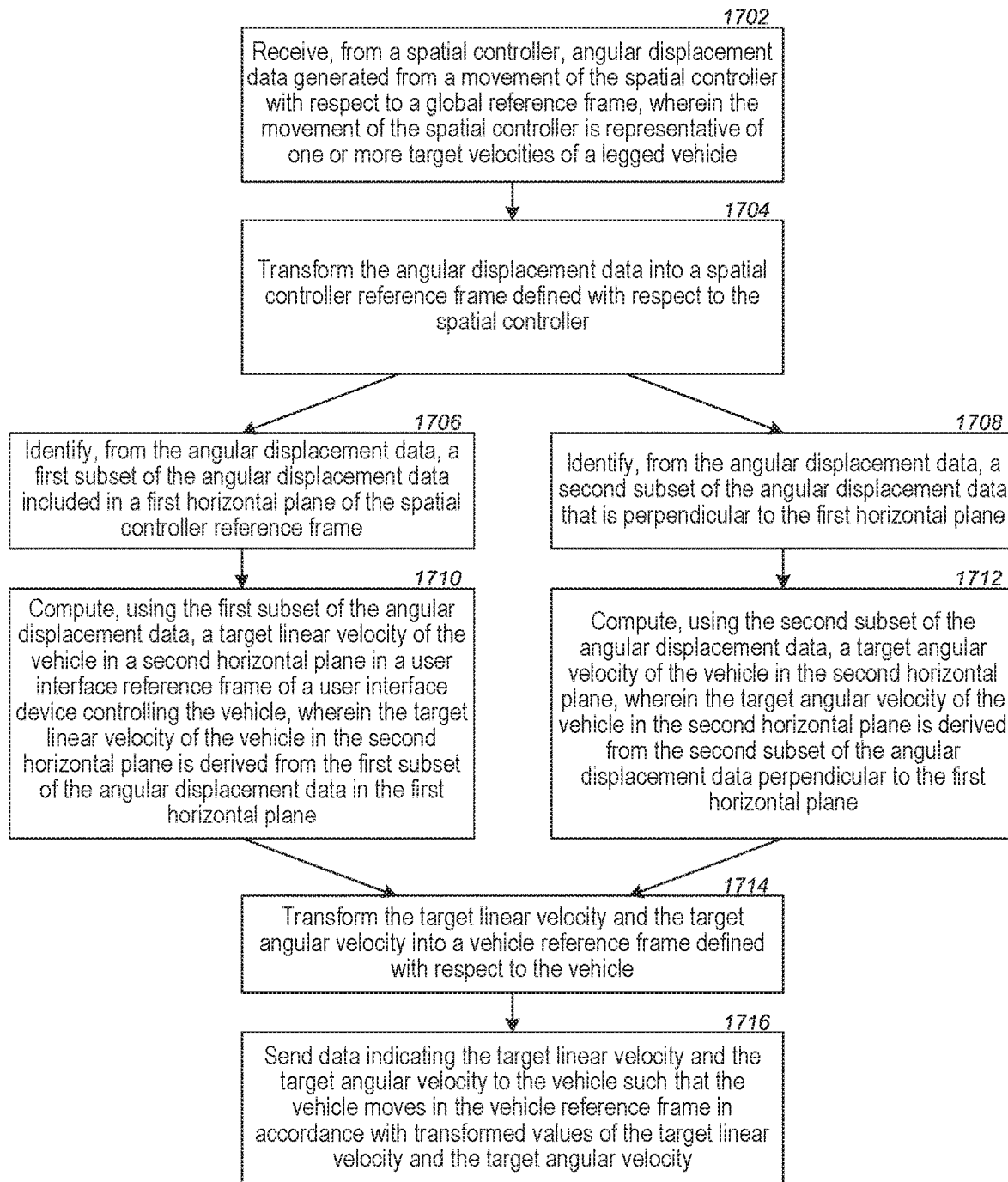
FIG. 17 is an example flowchart of a process for teleoperating a legged vehicle in accordance with a traverse mode.

FIG. 17 is an example flowchart of a process for teleoperating a vehicle in accordance with a traverse mode. At step 1702, the process receives, from a spatial controller, angular displacement data generated from a movement of the spatial controller with respect to a global reference frame, wherein the movement of the spatial controller is representative of one or more target velocities of a legged vehicle. The process transforms (at step 1704) the angular displacement data into a spatial controller reference frame defined with respect to the spatial controller. At step 1706, the process identifies a first subset of the angular displacement data included in a first horizontal plane of the spatial controller reference frame. At step 1708, the process identifies (from the angular displacement data) a second subset of the angular displacement data that is perpendicular to the first horizontal plane. At step 1710, the process computes, using the first subset of the angular displacement data, a target linear velocity of the vehicle in a second horizontal plane in a user interface reference frame of a user interface device controlling the vehicle, wherein the target linear velocity of the vehicle in the second horizontal plane is derived from the first subset of the angular displacement data in the first horizontal plane. For example, the target linear velocity of the vehicle in the second horizontal plane could be computed by taking the cross product of the first subset of the angular displacement data by the vertical axis of the user interface reference frame (perpendicular to the second horizontal plane), such that the linear velocity of the vehicle corresponds to the angular displacement of the spatial controller in an intuitive fashion when viewed from the camera view displayed by the user interface device. At step 1712, the process computes, using the second subset of the angular displacement data, a target angular velocity of the vehicle in the second horizontal plane. For example, the target angular velocity could be computed by multiplying the second subset of angular displacement data by a constant gain (e.g. 2). At step 1714, the process transforms the target linear velocity and the target angular velocity into a vehicle reference frame defined with respect to the vehicle. At step 1716, the process sends data indicating the target linear velocity and the target angular velocity to the vehicle such that the vehicle moves in the vehicle reference frame in accordance with transformed values of the target linear velocity and the target angular velocity. It will be understood that several steps of the process can occur in a parallel or near parallel manner. Also, some steps can be optional depending on the specific use case to which the process is directed.

Figure 18:
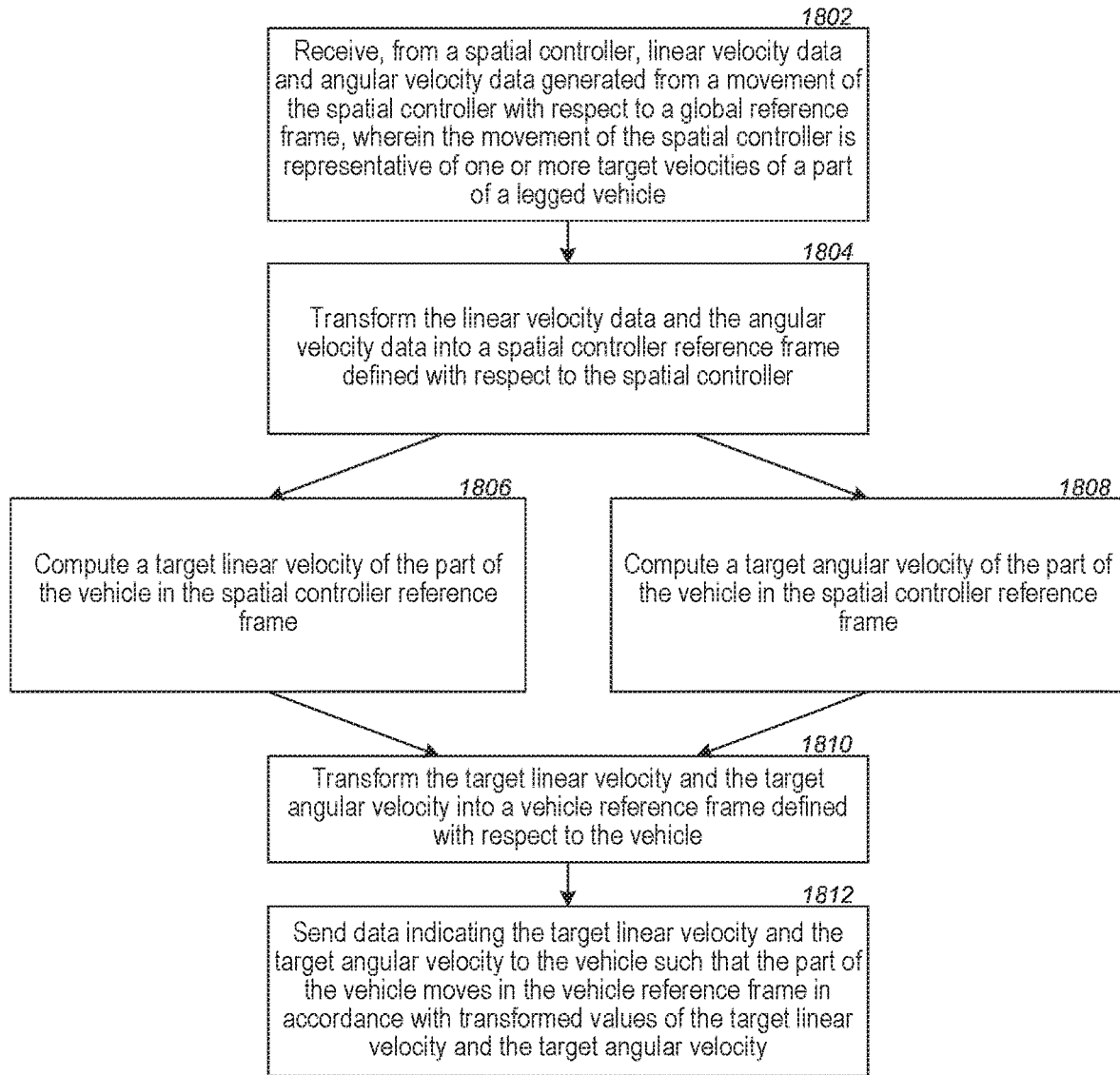
FIG. 18 is an example flowchart of a process for teleoperating a legged vehicle in accordance with either a reorient mode or a manipulate mode.

FIG. 18 is an example flowchart of a process for teleoperating the body, leg, or other part of a legged vehicle in accordance with one of either a reorient mode or a manipulate mode. At step 1802, the process receives, from a spatial controller, linear velocity data and angular velocity data generated from a movement of the spatial controller with respect to a global reference frame, wherein the movement of the spatial controller is representative of one or more target velocities of a part of a legged vehicle. The process transforms (at step 1804) the linear velocity data and the angular velocity data into a spatial controller reference frame defined with respect to the spatial controller. At step 1806, the process computes a target linear velocity of the part of the vehicle in the spatial controller reference frame, wherein the target linear velocity of the part of the vehicle is derived from the linear velocity data of the spatial controller in the spatial controller reference frame. At step 1808, the process computes a target angular velocity of the part of the vehicle in the spatial controller reference frame, wherein the target linear velocity of the part of the vehicle is derived from the angular velocity data of the spatial controller in the spatial controller reference frame. At step 1810, the process transforms the target linear velocity and the target angular velocity into a vehicle reference frame defined with respect to the vehicle. At step 1812, the process sends data indicating the target linear velocity and the target angular velocity to the vehicle such that the part of the vehicle moves in the vehicle reference frame in accordance with transformed values of the target linear velocity and the target angular velocity. It will be understood that several steps of the process can occur in a parallel or near parallel manner. Also, some steps can be optional depending on the specific use case to which the process is directed.

Figure 19:
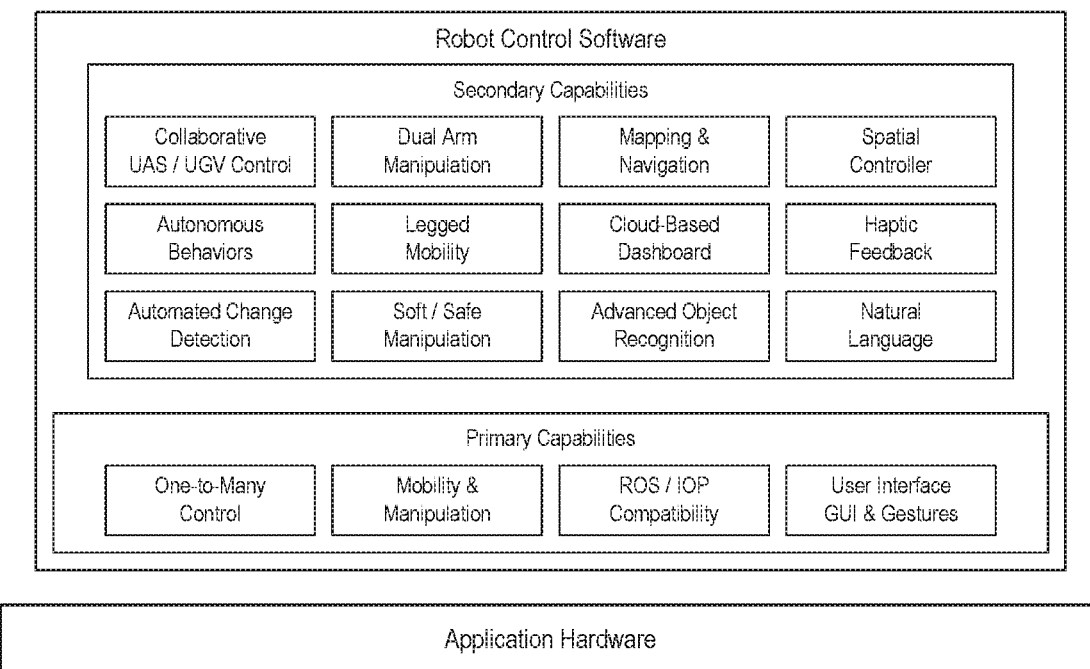
FIG. 19 shows a diagrammatic representation of the robotic control system stack.

FIG. 19 shows a diagrammatic representation of capabilities enabled by the disclosed robotic control system. In some embodiments, the capabilities can be divided into primary and secondary capabilities. The primary capabilities include control of different platforms/robots from a single user interface, integrated control of mobility and manipulation, ROS/IOP compatibility, and a user interface with inertial-based control and gesture recognition. In some embodiments, the disclosed robotic control system manages other robotic applications (e.g. a cloud-based monitoring system via a dashboard with capability of over-the-air updates). Thus, the disclosed control system allows easy upgrades of the robotic software. The dashboard can be easily accessible using any mobile or desktop interface. In some embodiments, the disclosed robotic control system has a fully ROS-compliant architecture with integrated support for interoperability (IOP) payloads.

The embodiments or portions thereof of the system and method of the present invention may be implemented in computer hardware, firmware, and/or computer programs executing on programmable computers or servers that each includes a processor and a storage medium readable by the processor (including volatile and non-volatile memory and/or storage elements). Any computer program may be implemented in a high-level procedural or object-oriented programming language to communicate within and outside of computer-based systems.

Any computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the embodiments. The embodiments, or portions thereof, may also be implemented as a machine-readable storage medium, configured with a computer program, where, upon execution, instructions in the computer program cause a machine to operate to perform the functions of the embodiments described above.

The embodiments, or portions thereof, of the system and method of the present invention described above may be used in a variety of applications. Although the embodiments, or portions thereof, are not limited in this respect, the embodiments, or portions thereof, may be implemented with memory devices in microcontrollers, general purpose microprocessors, digital signal processors (DSPs), reduced instruction-set computing (RISC), and complex instruction set computing (CISC), among other electronic components. Moreover, the embodiments, or portions thereof, described above may also be implemented using integrated circuit blocks referred to as main memory, cache memory, or other types of memory that store electronic instructions to be executed by a microprocessor or store data that may be used in arithmetic operations.

The descriptions are applicable in any computing or processing environment. The embodiments, or portions thereof, may be implemented in hardware, software, or a combination of the two. For example, the embodiments, or portions thereof, may be implemented using circuitry, such as one or more of programmable logic (e.g., an ASIC), logic gates, a processor, and a memory.

Various modifications to the disclosed embodiments will be apparent to those skilled in the art, and the general principals set forth below may be applied to other embodiments and applications. Thus, the present disclosure is not intended to be limited to the embodiments shown or described herein.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method of detecting an intent of spatial control of a vehicle comprising:
   receiving, from a spatial controller, spatial motion data generated from movement of the spatial controller with respect to a global reference frame, wherein the spatial motion data of the spatial controller is representative of a desired motion of at least a portion of a vehicle;
   computing, from the spatial motion data, an initial desired velocity vector representing a desired linear velocity or a desired angular velocity of at least the portion of the vehicle;
   transforming the initial desired velocity vector from the global reference frame into a control reference frame;
   identifying, from a set of principal axis directions that are parallel to principal axes of the control reference frame, a nearest principal axis direction based on comparing a direction of the initial desired velocity vector with the set of principal axis directions;
   computing a misalignment angle that represents a deviation in the direction of the initial desired velocity vector from the nearest principal axis direction;
   upon determining that the misalignment angle is less than or equal to an axis-snapping tolerance value, defining a final desired velocity vector by rotating the initial desired velocity vector such that the final desired velocity vector parallel to the nearest principal axis direction; and
   sending information indicating the final desired velocity vector to at least the portion of the vehicle.

2. The method of claim 1, wherein at least the portion of the vehicle is remotely located from the spatial controller, and wherein sending the final desired velocity vector uses a wired network connection or a wireless network connection.

3. The method of claim 1, further comprising:
   upon determining that the misalignment angle is greater than the axis-snapping tolerance value, defining the final desired velocity vector equal to the initial desired velocity vector.

4. The method of claim 1, wherein transforming the initial desired velocity vector from the global reference frame into the control reference frame includes:
   selecting the control reference frame from one of: a reference frame of the spatial controller, a reference frame of a user interface, a reference frame of at least the portion of the vehicle.

5. The method of claim 1, wherein sending the information indicating the final desired velocity vector includes:
   transforming the final desired velocity vector into a reference frame of at least the portion of the vehicle.

6. A method of detecting an intended regime of a velocity command associated with spatial control of a vehicle comprising:
   receive, from a spatial controller, spatial motion data generated from movement of the spatial controller with respect to a global reference frame, wherein the spatial motion data is representative of a desired motion of at least a portion of a vehicle;
   compute, from the spatial motion data, a desired linear velocity vector and a desired angular velocity vector of at least the portion of the vehicle;
   compute a linear ratio by dividing a magnitude of the desired linear velocity vector by a linear magnitude threshold and an angular ratio by dividing a magnitude of the desired angular velocity vector by an angular magnitude threshold;
   upon determining that the linear ratio or the angular ratio satisfies one or more rules associated with the desired linear velocity vector, ignoring the desired linear velocity vector;
   upon determining that the linear ratio or the angular ratio satisfies one or more rules associated with the desired angular velocity vector, ignoring the desired angular velocity vector; and
   sending data indicating the desired linear velocity vector and the desired angular velocity vector to at least the portion of the vehicle.

7. The method of claim 6, wherein sending the data indicating the desired linear velocity vector and the desired angular velocity vector includes:
   transforming the desired linear velocity vector and the desired angular velocity vector into a reference frame defined with respect to at least the portion of the vehicle.

8. The method of claim 6, wherein ignoring the desired linear velocity vector and/or ignoring the desired angular velocity vector includes:
   setting the desired linear velocity vector and/or the desired angular velocity vector to zero.

9. The method of claim 6, wherein the desired linear velocity vector and/or the desired angular velocity vector are represented in at least one of: a 1-dimensional space, a 2-dimensional space, or a 3-dimensional space.

10. The method of claim 6, wherein the spatial motion data generated from the movement of the spatial controller includes at least one linear degree-of-freedom and at least one angular degree-of-freedom.

11. The method of claim 6, wherein the one or more rules associated with the desired linear velocity vector include a rule to determine whether the linear ratio is less than 1 and also less than the angular ratio.

12. The method of claim 6, wherein the one or more rules associated with the desired angular velocity vector include a rule to determine whether the angular ratio is less than 1 and also less than the linear ratio.

13. A method of computing a sliding velocity limit boundary for a spatial controller comprising:
   receiving, at a computing device electronically coupled to the spatial controller configured to remotely operate a vehicle, information describing a first position boundary of the spatial controller corresponding to a maximum velocity of the vehicle or a part thereof;
   receiving information describing a current position of the spatial controller;
   using the information describing the current position of the spatial controller to determine that the current position of the spatial controller is outside the first position boundary;
   identifying a displacement vector corresponding to a difference between the current position of the spatial controller and the first position boundary;
   adding the displacement vector to the first position boundary to generate a second position boundary such that the current position of the spatial controller is at the second position boundary;
   updating the first position boundary as the second position boundary; and
   computing a target velocity of the vehicle or the part thereof, based on a difference between the current position of the spatial controller and a center of the first position boundary such that the vehicle or the part thereof to move in accordance with the target velocity.

14. The method of claim 13, wherein the current position of the spatial controller, the first position boundary, and the second position boundary are represented using one of: a 1-dimensional space, a 2-dimensional space, or a 3-dimensional space.

15. The method of claim 13, further comprising:
upon determining that the current position of the spatial controller is inside the first position boundary, keeping the first position boundary unchanged.

* * * * *